US008024255B2

(12) United States Patent
Anguish et al.

(10) Patent No.: US 8,024,255 B2
(45) Date of Patent: Sep. 20, 2011

(54) FACTORIZATION OF INTEREST RATE SWAP VARIATION

(75) Inventors: Keith A. Anguish, Homer Glen, IL (US); Sunil K. Cutinho, Park Ridge, IL (US); Dmitriy Glinberg, Northbrook, IL (US); Suneel Iyer, Chicago, IL (US); Dale Michaels, Westmont, IL (US); Ketan B. Patel, Hanover Park, IL (US)

(73) Assignee: Chicago Mercantile Exchange, Inc., Chicago, IL (US)

( * ) Notice: Subject to any disclaimer, the term of this patent is extended or adjusted under 35 U.S.C. 154(b) by 677 days.

(21) Appl. No.: 11/950,117

(22) Filed: Dec. 4, 2007

(65) Prior Publication Data

US 2008/0249958 A1  Oct. 9, 2008

Related U.S. Application Data

(60) Provisional application No. 60/910,568, filed on Apr. 6, 2007.

(51) Int. Cl.
*G06Q 40/00* (2006.01)
(52) U.S. Cl. ......................................................... 705/37
(58) Field of Classification Search ...................... 705/37
See application file for complete search history.

(56) References Cited

U.S. PATENT DOCUMENTS

| 6,304,858 B1 * | 10/2001 | Mosler et al. ................... 705/37 |
| 2002/0107774 A1 * | 8/2002 | Henninger et al. .............. 705/37 |
| 2003/0135450 A1 * | 7/2003 | Aguais et al. ................... 705/38 |
| 2007/0011079 A1 | 1/2007 | May |
| 2007/0055609 A1 | 3/2007 | Whitehurst |

OTHER PUBLICATIONS

Nielsen and Ronn, The Valuation of Default Risk in Corporate Bonds and Interest Rate Swaps, The Wharton School, Oct. 1994.*
Duffie and Singleton, An Econometric Model of the Term Structure of Inerest-Rate Swap Yields, The Journal of Finance, vol. LII, No. 4, Sep. 1997.*
Mark Grinblatt, An Analytic Solution for Interest Rate Swap Spread, UCLA Anderson Graduate School of Management, Oct. 20, 1993.*
Longstaff, F.A., et al., "Corporate Yield Spreads: Default Risk or Liquidity? New Evidence from the Credit Default Swap Market", The Journal of Finance, vol. 60, No. 5, pp. 2213-2253, Oct. 2005, http:/www.princeton,.edu/~bcf/Longstaffpaper.pdf.
International Search Report and Written Opinion of PCT/US2007/024904 mailed May 8, 2008.
International Preliminary Report on Patentability and Written Opinion for PCT/US2007/024904 mailed Oct. 6, 2009.

* cited by examiner

*Primary Examiner* — Alexander Kalinowski
*Assistant Examiner* — Chuks Onyezia
(74) *Attorney, Agent, or Firm* — Banner & Witcoff Ltd.

(57) ABSTRACT

Methods are described for processing and clearing derivative products such as interest rate swaps (IRSs). A swap value factor (SVF) may be generated to calculate the mark-to-market value of an IRS. The SVF may be a function of interest rates derived from a yield curve. Cash flow may be generated between the buyer and the seller to reflect the change in the market price of the derivative, i.e., the mark-to-market process. The results of a cleared swap may be used to determine or alter the margin deposit required by the buyer or seller.

21 Claims, 37 Drawing Sheets

Fixed NPV as of 3/14/07 (discounted to March 07 IMM date)

| Coupon Date | Fixed Rate | Notional Amount | Daycount Fraction | IMM Discount Factor | PV(Coupon) |
|---|---|---|---|---|---|
| Monday, June 18, 2007 | 5.3208% | $100,000,000.00 | 0.2528 | 0.986728696 | $1,327,130.36 |

Fixed NPV as of 3/13/07 (discounted to March 07 IMM date)

| Coupon Date | Fixed Rate | Notional Amount | Daycount Fraction | IMM Discount Factor | PV(Coupon) |
|---|---|---|---|---|---|
| Monday, June 18, 2007 | 5.8254% | $100,000,000.00 | 0.2528 | 0.986728696 | $1,452,989.25 |

MTM Calculation (discounted back to 3/14)

| Fixed NPV as of 3/14 | Fixed NPV as of 3/13 | MTM, 3/14 relative to 3/13 |
|---|---|---|
| $1,326,137.16 | $1,451,901.86 | -$125,764.70 |

[(Swap Fixed Rate at time "T") − (Swap Fixed Rate at time "T-t")]*(Swap Value Factor at time "T")

302

Yield Curve – Wednesday May 30th, 2007

| Dates | Yield Curve Rate |
|---|---|
| Monday, June 18, 2007 | 5.3808% |
| Monday, July 16, 2007 | 5.3811% |
| Monday, August 20, 2007 | 5.3812% |
| Monday, September 17, 2007 | 5.3820% |
| Monday, October 15, 2007 | 5.3830% |
| Monday, November 19, 2007 | 5.3875% |
| Monday, December 17, 2007 | 5.3880% |
| Monday, January 21, 2008 | 5.3899% |
| Monday, February 18, 2008 | 5.3900% |
| Monday, March 17, 2008 | 5.4570% |
| Monday, April 21, 2008 | 6.0564% |
| Monday, May 19, 2008 | 5.9790% |
| Monday, June 16, 2008 | 5.8680% |
| Monday, July 21, 2008 | 5.8531% |
| Monday, August 18, 2008 | 5.7120% |
| Monday, September 22, 2008 | 5.6800% |
| Monday, October 20, 2008 | 5.6830% |
| Monday, November 17, 2008 | 5.7530% |
| Monday, December 22, 2008 | 5.8230% |
| Monday, January 19, 2009 | 5.8930% |
| Monday, February 16, 2009 | 5.9630% |
| Monday, March 16, 2009 | 6.0330% |
| Monday, April 20, 2009 | 6.1030% |
| Monday, May 18, 2009 | 6.1730% |
| Monday, June 22, 2009 | 6.2430% |
| Monday, July 20, 2009 | 6.3130% |
| Monday, August 17, 2009 | 6.3830% |
| Monday, September 14, 2009 | 6.4530% |
| Monday, October 19, 2009 | 6.5230% |
| Monday, November 23, 2009 | 6.5930% |
| Monday, December 21, 2009 | 6.6630% |
| Monday, January 18, 2010 | 6.6930% |
| Monday, February 22, 2010 | 6.7230% |
| Monday, March 22, 2010 | 6.7530% |
| Monday, April 19, 2010 | 6.7830% |
| Monday, May 17, 2010 | 6.8130% |
| Monday, June 21, 2010 | 6.7530% |

Figure 3

Yield Curve - Thursday May 31st, 2007

402

| Dates | Yield Curve Rate |
|---|---|
| Monday, June 18, 2007 | 5.3008% |
| Monday, July 16, 2007 | 5.3011% |
| Monday, August 20, 2007 | 5.3012% |
| Monday, September 17, 2007 | 5.3020% |
| Monday, October 15, 2007 | 5.3030% |
| Monday, November 19, 2007 | 5.3075% |
| Monday, December 17, 2007 | 5.3080% |
| Monday, January 21, 2008 | 5.3099% |
| Monday, February 18, 2008 | 5.3100% |
| Monday, March 17, 2008 | 5.3770% |
| Monday, April 21, 2008 | 5.9764% |
| Monday, May 19, 2008 | 5.8990% |
| Monday, June 16, 2008 | 5.7880% |
| Monday, July 21, 2008 | 5.7731% |
| Monday, August 18, 2008 | 5.6320% |
| Monday, September 22, 2008 | 5.6000% |
| Monday, October 20, 2008 | 5.6030% |
| Monday, November 17, 2008 | 5.6730% |
| Monday, December 22, 2008 | 5.7430% |
| Monday, January 19, 2009 | 5.8130% |
| Monday, February 16, 2009 | 5.8830% |
| Monday, March 16, 2009 | 5.9530% |
| Monday, April 20, 2009 | 6.0230% |
| Monday, May 18, 2009 | 6.0930% |
| Monday, June 22, 2009 | 6.1630% |
| Monday, July 20, 2009 | 6.2330% |
| Monday, August 17, 2009 | 6.3030% |
| Monday, September 14, 2009 | 6.3730% |
| Monday, October 19, 2009 | 6.4430% |
| Monday, November 23, 2009 | 6.5130% |
| Monday, December 21, 2009 | 6.5830% |
| Monday, January 18, 2010 | 6.6130% |
| Monday, February 22, 2010 | 6.6430% |
| Monday, March 22, 2010 | 6.6730% |
| Monday, April 19, 2010 | 6.7030% |
| Monday, May 17, 2010 | 6.7330% |
| Monday, June 21, 2010 | 6.7530% |

Figure 4

Fixed NPV Calculation as of May 30, 2007 Settlement
Applicable IMM Discount Factors

| Dates | Yield Curve Rate | Days | Daycount Fraction | IMM Discount Factor | Cumulative Discounted Daycounts |
|---|---|---|---|---|---|
| Monday, June 18, 2007 | N/A | N/A | N/A | 1 | 0 |
| Monday, September 17, 2007 | 5.3020% | 91 | 0.2528 | 0.986774968 | 0.249434784 |
| Monday, December 17, 2007 | 5.3080% | 91 | 0.2528 | 0.973695496 | 0.495563367 |
| Monday, March 17, 2008 | 5.3770% | 91 | 0.2528 | 0.960301276 | 0.73830619 |
| Monday, June 16, 2008 | 5.7880% | 91 | 0.2528 | 0.943463237 | 0.97679273 |
| Monday, September 22, 2008 | 5.6000% | 98 | 0.2722 | 0.931105422 | 1.230260318 |
| Monday, December 22, 2008 | 5.7430% | 91 | 0.2528 | 0.916047858 | 1.461816859 |
| Monday, March 16, 2009 | 5.9530% | 84 | 0.2333 | 0.900470211 | 1.671926575 |
| Monday, June 22, 2009 | 6.1630% | 98 | 0.2722 | 0.882159132 | 1.912069895 |
| Monday, September 14, 2009 | 6.3730% | 84 | 0.2333 | 0.865276831 | 2.113967822 |
| Monday, December 21, 2009 | 6.5830% | 98 | 0.2722 | 0.845682538 | 2.344181402 |
| Monday, March 22, 2010 | 6.6730% | 91 | 0.2528 | 0.829579543 | 2.553880675 |
| Monday, June 21, 2010 | 6.7530% | 91 | 0.2528 | 0.813647409 | 2.759552659 |

Individual Coupon Value Factors — 506

| Dates | Days | Daycount Fraction | IMM Discount Factor | Spot Discount Factor | Coupon Value Factor |
|---|---|---|---|---|---|
| Monday, September 17, 2007 | 91 | 0.2528 | 0.986774968 | 0.982524028 | 0.24836024 |
| Monday, December 17, 2007 | 91 | 0.2528 | 0.973695496 | 0.969500902 | 0.24506828 |
| Monday, March 17, 2008 | 91 | 0.2528 | 0.960301276 | 0.956164383 | 0.24169711 |
| Monday, June 16, 2008 | 91 | 0.2528 | 0.943463237 | 0.939398881 | 0.23745916 |
| Monday, September 22, 2008 | 98 | 0.2722 | 0.931105422 | 0.927094302 | 0.25237567 |
| Monday, December 22, 2008 | 91 | 0.2528 | 0.916047858 | 0.912101605 | 0.23055902 |
| Monday, March 16, 2009 | 84 | 0.2333 | 0.900470211 | 0.896591065 | 0.20920458 |
| Monday, June 22, 2009 | 98 | 0.2722 | 0.882159132 | 0.878358869 | 0.23910880 |
| Monday, September 14, 2009 | 84 | 0.2333 | 0.865276831 | 0.861549295 | 0.20102817 |
| Monday, December 21, 2009 | 98 | 0.2722 | 0.845682538 | 0.842039413 | 0.22922184 |
| Monday, March 22, 2010 | 91 | 0.2528 | 0.829579543 | 0.826005787 | 0.20879591 |
| Monday, June 21, 2010 | 91 | 0.2528 | 0.813647409 | 0.810142288 | 0.20478597 |

Fixed NPV on Dec-07 CME Swap as of 5/30/2007 — 503

| May 30th Fixed Rate | Notional | Swap Value Factor | May 30th Fixed NPV |
|---|---|---|---|
| 6.7530% | $1,000,000,000.00 | 2.7476647499 | $185,549,800.56 |

Figure 5

Fixed NPV Calculation as of May 31, 2007 Settlement
Applicable IMM Discount Factors

| Dates | Yield Curve Rate | Days | Daycount Fraction | IMM Discount Factor | Cumulative Discounted Daycounts |
|---|---|---|---|---|---|
| Monday, June 18, 2007 | N/A | N/A | N/A | 1 | 0 |
| Monday, September 17, 2007 | 5.3020% | 91 | 0.2528 | 0.986774968 | 0.249434784 |
| Monday, December 17, 2007 | 5.3080% | 91 | 0.2528 | 0.973695496 | 0.495563367 |
| Monday, March 17, 2008 | 5.3770% | 91 | 0.2528 | 0.960301276 | 0.738930619 |
| Monday, June 16, 2008 | 5.7880% | 91 | 0.2528 | 0.943463237 | 0.976792273 |
| Monday, September 22, 2008 | 5.6000% | 98 | 0.2722 | 0.931105422 | 1.230260318 |
| Monday, December 22, 2008 | 5.7430% | 91 | 0.2528 | 0.916047858 | 1.461816859 |
| Monday, March 16, 2009 | 5.9530% | 84 | 0.2333 | 0.900470211 | 1.671926575 |
| Monday, June 22, 2009 | 6.1630% | 98 | 0.2722 | 0.882159132 | 1.912069895 |
| Monday, September 14, 2009 | 6.3730% | 84 | 0.2333 | 0.865276831 | 2.113967822 |
| Monday, December 21, 2009 | 6.5830% | 98 | 0.2722 | 0.845682538 | 2.344181402 |
| Monday, March 22, 2010 | 6.6730% | 91 | 0.2528 | 0.829579543 | 2.553880675 |
| Monday, June 21, 2010 | 6.7530% | 91 | 0.2528 | 0.813647409 | 2.759552659 |

606

Individual Coupon Value Factors

| Dates | Days | Daycount Fraction | IMM Discount Factor | Spot Discount Factor | Coupon Value Factor |
|---|---|---|---|---|---|
| Monday, September 17, 2007 | 91 | 0.2528 | 0.986774968 | 0.982524028 | 0.24836024 |
| Monday, December 17, 2007 | 91 | 0.2528 | 0.973695496 | 0.969500902 | 0.24506828 |
| Monday, March 17, 2008 | 91 | 0.2528 | 0.960301276 | 0.956164383 | 0.24169711 |
| Monday, June 16, 2008 | 91 | 0.2528 | 0.943463237 | 0.939398881 | 0.23745916 |
| Monday, September 22, 2008 | 98 | 0.2722 | 0.931105422 | 0.927094302 | 0.25237567 |
| Monday, December 22, 2008 | 91 | 0.2528 | 0.916047858 | 0.912101605 | 0.23055902 |
| Monday, March 16, 2009 | 84 | 0.2333 | 0.900470211 | 0.896591065 | 0.20920458 |
| Monday, June 22, 2009 | 98 | 0.2722 | 0.882159132 | 0.878358869 | 0.23910880 |
| Monday, September 14, 2009 | 84 | 0.2333 | 0.865276831 | 0.861549295 | 0.20102817 |
| Monday, December 21, 2009 | 98 | 0.2722 | 0.845682538 | 0.842039413 | 0.22922184 |
| Monday, March 22, 2010 | 91 | 0.2528 | 0.829579543 | 0.826005787 | 0.20879591 |
| Monday, June 21, 2010 | 91 | 0.2528 | 0.813647409 | 0.810142288 | 0.20478597 |

608 ⎫ 604

MTM on Jun-10 Swap using SVF method

| May 31st Fixed Rate | Notional | Swap Value Factor | May 31st Fixed NPV | MTM, 5/31 relative to 5/30 |
|---|---|---|---|---|
| 6.7530% | $1,000,000,000.00 | 2.7476647499 | $185,549,800.56 | $0.00 |

Fixed NPV as of 5/31/07 (discounted to June07 IMM date)

| Coupon Date | Fixed Rate | Notional | Daycount Fraction | IMM Discount Factor | PV(Coupon) |
|---|---|---|---|---|---|
| Monday, September 17, 2007 | 6.7530% | $1,000,000,000.00 | 0.2528 | 0.986774968 | $16,844,330.93 |
| Monday, December 17, 2007 | 6.7530% | $1,000,000,000.00 | 0.2528 | 0.973695496 | $16,621,063.27 |
| Monday, March 17, 2008 | 6.7530% | $1,000,000,000.00 | 0.2528 | 0.960301276 | $16,392,422.81 |
| Monday, June 16, 2008 | 6.7530% | $1,000,000,000.00 | 0.2528 | 0.943463237 | $16,104,996.07 |
| Monday, September 22, 2008 | 6.7530% | $1,000,000,000.00 | 0.2722 | 0.931105422 | $17,116,666.16 |
| Monday, December 22, 2008 | 6.7530% | $1,000,000,000.00 | 0.2528 | 0.916047858 | $15,637,013.27 |
| Monday, March 16, 2009 | 6.7530% | $1,000,000,000.00 | 0.2333 | 0.900470211 | $14,188,709.11 |
| Monday, June 22, 2009 | 6.7530% | $1,000,000,000.00 | 0.2722 | 0.882159132 | $16,216,878.36 |
| Monday, September 14, 2009 | 6.7530% | $1,000,000,000.00 | 0.2333 | 0.865276831 | $13,634,167.02 |
| Monday, December 21, 2009 | 6.7530% | $1,000,000,000.00 | 0.2722 | 0.845682538 | $15,546,323.05 |
| Monday, March 22, 2010 | 6.7530% | $1,000,000,000.00 | 0.2528 | 0.829579543 | $14,160,991.92 |
| Monday, June 21, 2010 | 6.7530% | $1,000,000,000.00 | 0.2528 | 0.813647409 | $13,889,029.07 |
|  |  |  |  | Fixed NPV discounted to 6/18 | $186,352,591.05 |

Fixed NPV as of 5/31/07 (discounted to June07 IMM date)

| Coupon Date | Fixed Rate | Notional | Daycount Fraction | IMM Discount Factor | PV(Coupon) |
|---|---|---|---|---|---|
| Monday, September 17, 2007 | 6.7530% | $1,000,000,000.00 | 0.2528 | 0.986774968 | $16,844,330.93 |
| Monday, December 17, 2007 | 6.7530% | $1,000,000,000.00 | 0.2528 | 0.973695496 | $16,621,063.27 |
| Monday, March 17, 2008 | 6.7530% | $1,000,000,000.00 | 0.2528 | 0.960301276 | $16,392,422.81 |
| Monday, June 16, 2008 | 6.7530% | $1,000,000,000.00 | 0.2528 | 0.943463237 | $16,104,996.07 |
| Monday, September 22, 2008 | 6.7530% | $1,000,000,000.00 | 0.2722 | 0.931105422 | $17,116,666.16 |
| Monday, December 22, 2008 | 6.7530% | $1,000,000,000.00 | 0.2528 | 0.916047858 | $15,637,013.27 |
| Monday, March 16, 2009 | 6.7530% | $1,000,000,000.00 | 0.2333 | 0.900470211 | $14,188,709.11 |
| Monday, June 22, 2009 | 6.7530% | $1,000,000,000.00 | 0.2722 | 0.882159132 | $16,216,878.36 |
| Monday, September 14, 2009 | 6.7530% | $1,000,000,000.00 | 0.2333 | 0.865276831 | $13,634,167.02 |
| Monday, December 21, 2009 | 6.7530% | $1,000,000,000.00 | 0.2722 | 0.845682538 | $15,546,323.05 |
| Monday, March 22, 2010 | 6.7530% | $1,000,000,000.00 | 0.2528 | 0.829579543 | $14,160,991.92 |
| Monday, June 21, 2010 | 6.7530% | $1,000,000,000.00 | 0.2528 | 0.813647409 | $13,889,029.07 |
|  |  |  |  | Fixed NPV discounted to 6/18 | $186,352,591.05 |

MTM Calculation (discounted back to 5/31)

| Fixed NPV using 5/31 settle | Fixed NPV using 5/30 settle | MTM, 5/31 relative to 5/30 |
|---|---|---|
| $185,549,800.56 | $185,549,800.56 | $0.00 |

Figure 7

Yield Curve - Tuesday March 13th, 2007

| Dates | Yield Curve Rate |
| --- | --- |
| Monday, March 19, 2007 | 5.3150% |
| Monday, April 16, 2007 | 5.3550% |
| Monday, May 21, 2007 | 5.3950% |
| Monday, June 18, 2007 | 5.8254% |
| Monday, July 16, 2007 | 5.8654% |
| Monday, August 20, 2007 | 5.9054% |
| Monday, September 17, 2007 | 5.9454% |
| Monday, October 15, 2007 | 5.9854% |
| Monday, November 19, 2007 | 6.0254% |
| Monday, December 17, 2007 | 5.9454% |
| Monday, January 21, 2008 | 5.8654% |
| Monday, February 18, 2008 | 5.7854% |
| Monday, March 17, 2008 | 5.7054% |
| Monday, April 21, 2008 | 5.6254% |
| Monday, May 19, 2008 | 5.5454% |
| Monday, June 16, 2008 | 5.4654% |
| Monday, July 21, 2008 | 5.3854% |
| Monday, August 18, 2008 | 5.3054% |
| Monday, September 22, 2008 | 5.2254% |

Yield Curve - Wednesday March 14th, 2007

| Dates | Yield Curve Rate |
| --- | --- |
| Monday, March 19, 2007 | 5.4050% |
| Monday, April 16, 2007 | 5.4100% |
| Monday, May 21, 2007 | 5.4102% |
| Monday, June 18, 2007 | 5.3208% |
| Monday, July 16, 2007 | 5.4111% |
| Monday, August 20, 2007 | 5.4112% |
| Monday, September 17, 2007 | 5.4120% |
| Monday, October 15, 2007 | 5.4130% |
| Monday, November 19, 2007 | 5.4175% |
| Monday, December 17, 2007 | 5.4180% |
| Monday, January 21, 2008 | 5.3799% |
| Monday, February 18, 2008 | 5.3800% |
| Monday, March 17, 2008 | 5.4470% |
| Monday, April 21, 2008 | 6.0464% |
| Monday, May 19, 2008 | 5.9690% |
| Monday, June 16, 2008 | 5.8580% |
| Monday, July 21, 2008 | 5.8431% |
| Monday, August 18, 2008 | 5.7020% |
| Monday, September 22, 2008 | 5.6700% |

Figure 8

Yield Curve - Tuesday June 12th, 2007

| Date | Yield | Date | Yield |
|---|---|---|---|
| Monday, June 18, 2007 | 5.3808% | Monday, September 05, 2022 | 5.0208% |
| Monday, September 17, 2007 | 5.4108% | Monday, December 05, 2022 | 5.0308% |
| Monday, December 17, 2007 | 5.4408% | Monday, March 06, 2023 | 5.0408% |
| Monday, March 17, 2008 | 5.4708% | Monday, June 05, 2023 | 5.0508% |
| Monday, June 16, 2008 | 5.5008% | Monday, September 04, 2023 | 5.0608% |
| Monday, September 22, 2008 | 5.5308% | Monday, December 04, 2023 | 5.0708% |
| Monday, December 22, 2008 | 5.5608% | Monday, March 04, 2024 | 5.0808% |
| Monday, March 16, 2009 | 5.5908% | Monday, June 03, 2024 | 5.0908% |
| Monday, June 22, 2009 | 5.6208% | Monday, September 02, 2024 | 5.1008% |
| Monday, September 14, 2009 | 5.6508% | Monday, December 02, 2024 | 5.1108% |
| Monday, December 21, 2009 | 5.6808% | Monday, March 03, 2025 | 5.1208% |
| Monday, March 22, 2010 | 5.7108% | Monday, June 02, 2025 | 5.1308% |
| Monday, June 21, 2010 | 5.7408% | Monday, September 01, 2025 | 5.1408% |
| Monday, September 20, 2010 | 5.7708% | Monday, December 01, 2025 | 5.1508% |
| Monday, December 20, 2010 | 5.8008% | Monday, March 02, 2026 | 5.1608% |
| Monday, March 21, 2011 | 5.8308% | Monday, June 01, 2026 | 5.2508% |
| Monday, June 20, 2011 | 5.8608% | Monday, September 07, 2026 | 5.3408% |
| Monday, September 19, 2011 | 5.8908% | Monday, December 07, 2026 | 5.4308% |
| Monday, December 19, 2011 | 5.9208% | Monday, March 08, 2027 | 5.5208% |
| Monday, March 19, 2012 | 5.9508% | Monday, June 07, 2027 | 5.6108% |
| Monday, June 18, 2012 | 5.9808% | Monday, September 06, 2027 | 5.7008% |
| Monday, September 17, 2012 | 6.0108% | Monday, December 06, 2027 | 5.7908% |
| Monday, December 17, 2012 | 6.0408% | Monday, March 06, 2028 | 5.8808% |
| Monday, March 18, 2013 | 6.0708% | Monday, June 05, 2028 | 5.9708% |
| Monday, June 17, 2013 | 6.1008% | Monday, September 04, 2028 | 6.0608% |
| Monday, September 16, 2013 | 6.1308% | Monday, December 04, 2028 | 6.0908% |
| Monday, December 16, 2013 | 6.0708% | Monday, March 05, 2029 | 6.1208% |
| Monday, March 17, 2014 | 6.0108% | Monday, June 04, 2029 | 6.1508% |
| Monday, June 16, 2014 | 5.9508% | Monday, September 03, 2029 | 6.1808% |
| Monday, September 15, 2014 | 5.8908% | Monday, December 03, 2029 | 6.2108% |
| Monday, December 15, 2014 | 5.8308% | Monday, March 04, 2030 | 6.2408% |
| Monday, March 16, 2015 | 5.7708% | Monday, June 03, 2030 | 6.2708% |
| Monday, June 15, 2015 | 5.7108% | Monday, September 02, 2030 | 6.3008% |
| Monday, September 14, 2015 | 5.6508% | Monday, December 02, 2030 | 6.3308% |
| Monday, December 14, 2015 | 5.5908% | Monday, March 03, 2031 | 6.3608% |
| Monday, March 14, 2016 | 5.5308% | Monday, June 02, 2031 | 6.3908% |
| Monday, June 13, 2016 | 5.4708% | Monday, September 01, 2031 | 6.4208% |
| Monday, September 12, 2016 | 5.4108% | Monday, December 01, 2031 | 6.4508% |
| Monday, December 12, 2016 | 5.3508% | Monday, March 01, 2032 | 6.4808% |
| Monday, March 13, 2017 | 5.2908% | Monday, June 07, 2032 | 6.5108% |
| Monday, June 12, 2017 | 5.2308% | Monday, September 06, 2032 | 6.5408% |
| Monday, September 11, 2017 | 5.1708% | Monday, December 06, 2032 | 6.5008% |
| Monday, December 11, 2017 | 5.1108% | Monday, March 07, 2033 | 6.4608% |
| Monday, March 12, 2018 | 5.0508% | Monday, June 06, 2033 | 6.4208% |
| Monday, June 11, 2018 | 4.9908% | Monday, September 05, 2033 | 6.3808% |
| Monday, September 10, 2018 | 4.9308% | Monday, December 05, 2033 | 6.3408% |
| Monday, December 10, 2018 | 4.8708% | Monday, March 06, 2034 | 6.3008% |
| Monday, March 11, 2019 | 4.8808% | Monday, June 05, 2034 | 6.2608% |
| Monday, June 10, 2019 | 4.8908% | Monday, September 04, 2034 | 6.2208% |
| Monday, September 09, 2019 | 4.9008% | Monday, December 04, 2034 | 6.1808% |
| Monday, December 09, 2019 | 4.9108% | Monday, March 05, 2035 | 6.1408% |
| Monday, March 09, 2020 | 4.9208% | Monday, June 04, 2035 | 6.1008% |
| Monday, June 08, 2020 | 4.9308% | Monday, September 03, 2035 | 6.0608% |
| Monday, September 07, 2020 | 4.9408% | Monday, December 03, 2035 | 6.0208% |
| Monday, December 07, 2020 | 4.9508% | Monday, March 03, 2036 | 5.9808% |
| Monday, March 08, 2021 | 4.9608% | Monday, June 02, 2036 | 5.9408% |
| Monday, June 07, 2021 | 4.9708% | Monday, September 01, 2036 | 5.9008% |
| Monday, September 06, 2021 | 4.9808% | Monday, December 01, 2036 | 5.8608% |
| Monday, December 06, 2021 | 4.9908% | Monday, March 02, 2037 | 5.8208% |
| Monday, March 07, 2022 | 5.0008% | Monday, June 01, 2037 | 2.7808% |
| Monday, June 06, 2022 | 5.0108% | | |

Figure 9

Yield Curve - Wednesday June 13th, 2007

| Dates | Yield Curve Rate | Dates | Yield Curve Rate |
|---|---|---|---|
| Monday, June 18, 2007 | 5.3808% | Monday, March 07, 2022 | 3.7208% |
| Monday, September 17, 2007 | 5.3608% | Monday, June 06, 2022 | 3.6808% |
| Monday, December 17, 2007 | 5.3408% | Monday, September 05, 2022 | 3.6408% |
| Monday, March 17, 2008 | 5.3208% | Monday, December 05, 2022 | 3.6008% |
| Monday, June 16, 2008 | 5.3008% | Monday, March 06, 2023 | 3.5608% |
| Monday, September 22, 2008 | 5.2808% | Monday, June 05, 2023 | 3.5208% |
| Monday, December 22, 2008 | 5.2608% | Monday, September 04, 2023 | 3.4808% |
| Monday, March 16, 2009 | 5.2408% | Monday, December 04, 2023 | 3.4408% |
| Monday, June 22, 2009 | 5.2208% | Monday, March 04, 2024 | 3.4008% |
| Monday, September 14, 2009 | 5.2008% | Monday, June 03, 2024 | 3.3608% |
| Monday, December 21, 2009 | 5.1808% | Monday, September 02, 2024 | 3.3208% |
| Monday, March 22, 2010 | 5.1608% | Monday, December 02, 2024 | 3.2808% |
| Monday, June 21, 2010 | 5.1408% | Monday, March 03, 2025 | 3.2408% |
| Monday, September 20, 2010 | 5.1208% | Monday, June 02, 2025 | 3.2008% |
| Monday, December 20, 2010 | 5.1008% | Monday, September 01, 2025 | 3.1608% |
| Monday, March 21, 2011 | 5.0808% | Monday, December 01, 2025 | 3.1208% |
| Monday, June 20, 2011 | 5.0608% | Monday, March 02, 2026 | 3.0808% |
| Monday, September 19, 2011 | 5.0408% | Monday, June 01, 2026 | 3.0408% |
| Monday, December 19, 2011 | 5.0208% | Monday, September 07, 2026 | 3.0008% |
| Monday, March 19, 2012 | 5.0008% | Monday, December 07, 2026 | 2.9608% |
| Monday, June 18, 2012 | 4.9808% | Monday, March 08, 2027 | 2.9208% |
| Monday, September 17, 2012 | 4.9608% | Monday, June 07, 2027 | 2.8808% |
| Monday, December 17, 2012 | 4.9408% | Monday, September 06, 2027 | 2.8408% |
| Monday, March 18, 2013 | 4.9208% | Monday, December 06, 2027 | 2.8008% |
| Monday, June 17, 2013 | 4.9008% | Monday, March 06, 2028 | 2.7608% |
| Monday, September 16, 2013 | 4.8808% | Monday, June 05, 2028 | 2.7208% |
| Monday, December 16, 2013 | 4.8608% | Monday, September 04, 2028 | 2.6808% |
| Monday, March 17, 2014 | 4.8408% | Monday, December 04, 2028 | 2.6408% |
| Monday, June 16, 2014 | 4.8208% | Monday, March 05, 2029 | 2.6008% |
| Monday, September 15, 2014 | 4.8008% | Monday, June 04, 2029 | 2.5608% |
| Monday, December 15, 2014 | 4.7808% | Monday, September 03, 2029 | 2.5908% |
| Monday, March 16, 2015 | 4.7608% | Monday, December 03, 2029 | 2.6208% |
| Monday, June 15, 2015 | 4.7408% | Monday, March 04, 2030 | 2.6508% |
| Monday, September 14, 2015 | 4.7208% | Monday, June 03, 2030 | 2.6808% |
| Monday, December 14, 2015 | 4.7008% | Monday, September 02, 2030 | 2.7108% |
| Monday, March 14, 2016 | 4.6808% | Monday, December 02, 2030 | 2.7408% |
| Monday, June 13, 2016 | 4.6408% | Monday, March 03, 2031 | 2.7708% |
| Monday, September 12, 2016 | 4.6008% | Monday, June 02, 2031 | 2.8008% |
| Monday, December 12, 2016 | 4.5608% | Monday, September 01, 2031 | 2.8308% |
| Monday, March 13, 2017 | 4.5208% | Monday, December 01, 2031 | 2.8608% |
| Monday, June 12, 2017 | 4.4808% | Monday, March 01, 2032 | 2.8908% |
| Monday, September 11, 2017 | 4.4408% | Monday, June 07, 2032 | 2.9208% |
| Monday, December 11, 2017 | 4.4008% | Monday, September 06, 2032 | 2.9508% |
| Monday, March 12, 2018 | 4.3608% | Monday, December 06, 2032 | 2.9808% |
| Monday, June 11, 2018 | 4.3208% | Monday, March 07, 2033 | 3.0108% |
| Monday, September 10, 2018 | 4.2808% | Monday, June 06, 2033 | 3.0408% |
| Monday, December 10, 2018 | 4.2408% | Monday, September 05, 2033 | 3.0708% |
| Monday, March 11, 2019 | 4.2008% | Monday, December 05, 2033 | 3.1008% |
| Monday, June 10, 2019 | 4.1608% | Monday, March 06, 2034 | 3.1308% |
| Monday, September 09, 2019 | 4.1208% | Monday, June 05, 2034 | 3.1608% |
| Monday, December 09, 2019 | 4.0808% | Monday, September 04, 2034 | 3.1908% |
| Monday, March 09, 2020 | 4.0408% | Monday, December 04, 2034 | 3.2208% |
| Monday, June 08, 2020 | 4.0008% | Monday, March 05, 2035 | 3.2508% |
| Monday, September 07, 2020 | 3.9608% | Monday, June 04, 2035 | 3.2808% |
| Monday, December 07, 2020 | 3.9208% | Monday, September 03, 2035 | 3.3108% |
| Monday, March 08, 2021 | 3.8808% | Monday, December 03, 2035 | 3.3408% |
| Monday, June 07, 2021 | 3.8408% | Monday, March 03, 2036 | 3.4908% |
| Monday, September 06, 2021 | 3.8008% | Monday, June 02, 2036 | 3.6408% |
| Monday, December 06, 2021 | 3.7608% | Monday, September 01, 2036 | 3.7908% |
|  |  | Monday, December 01, 2036 | 3.9408% |
|  |  | Monday, March 02, 2037 | 4.0908% |
|  |  | Monday, June 01, 2037 | 4.2408% |

Figure 10

| Input | Value |
|---|---|
| Last Mark Date | Tuesday, March 13, 2007 |
| Today | Wednesday, March 14, 2007 |
| Forward IMM Start Date | Monday, March 19, 2007 |
| Notional Amount of Swap | $100,000,000.00 |
| OIS Swap Rate on March 13, 2007 | 4.5678% |
| Days between March 13, 2007 and March 19, 2007 | 6.0000 |
| OIS Swap Rate on March 14, 2007 | 5.3924% |
| Days between March 14, 2007 and March 19, 2007 | 5.0000 |
| Jun-07 CME Swap Settlement Rate on March 14, 2007 | 5.3208% |
| Jun-07 CME Swap Settlement Rate on March 13, 2007 | 5.8254% |

Figure 11

Fixed NPV Calculation as of March 13, 2007 Settlement
Applicable IMM Discount Factors

| Dates | Yield Curve Rate | Days | Daycount Fraction | IMM Discount Factor | Cumulative Discounted Daycounts |
|---|---|---|---|---|---|
| Monday, March 19, 2007 | N/A | N/A | N/A | 1 | 0 |
| Monday, June 18, 2007 | 5.3208% | 91 | 0.2528 | 0.986728696 | 0.249423087 |

Individual Swap Value Factors by coupon dates

| Dates | Days | Daycount Fraction | IMM Discount Factor | Spot Discount Factor | Coupon Value Factor |
|---|---|---|---|---|---|
| Monday, June 18, 2007 | 91 | 0.2528 | 0.986728696 | 0.985990244 | 0.24923642 |

Fixed NPV on Jun-07 CME Swap as of 3/13

| March 13th Fixed Rate | Notional Amount | Swap Value Factor | 3/13 Fixed NPV |
|---|---|---|---|
| 5.8254% | $100,000,000.00 | 0.24923642 | $1,451,901.86 |

Figure 12

Fixed NPV Calculation as of March 14, 2007 Settlement

| Dates | Yield Curve Rate | Days | Daycount Fraction | IMM Discount Factor | Cumulative Discounted Daycounts |
|---|---|---|---|---|---|
| Monday, March 19, 2007 | N/A | N/A | N/A | 1 | 0 |
| Monday, June 18, 2007 | 5.3208% | 91 | 0.2528 | 0.986728696 | 0.249423087 |

Individual Swap Value Factors by coupon dates

| Dates | Days | Daycount Fraction | IMM Discount Factor | Spot Discount Factor | Coupon Value Factor |
|---|---|---|---|---|---|
| Monday, June 18, 2007 | 91 | 0.2528 | 0.986728696 | 0.985990244 | 0.24923642 |

MTM on Jun-07 Swap using SVF method

| March 14th Fixed Rate | Notional Amount | Swap Value Factor | 3/14 Fixed NPV | MTM, 3/14 relative to 3/13 |
|---|---|---|---|---|
| 5.3208% | $100,000,000.00 | 0.24923642 | $1,326,137.16 | -$125,764.70 |

Figure 13

Fixed NPV as of 3/14/07 (discounted to March 07 IMM date)

| Coupon Date | Fixed Rate | Notional Amount | Daycount Fraction | IMM Discount Factor | PV(Coupon) |
|---|---|---|---|---|---|
| Monday, June 18, 2007 | 5.3208% | $100,000,000.00 | 0.2528 | 0.986728696 | $1,327,130.36 |

Fixed NPV as of 3/13/07 (discounted to March 07 IMM date)

| Coupon Date | Fixed Rate | Notional Amount | Daycount Fraction | IMM Discount Factor | PV(Coupon) |
|---|---|---|---|---|---|
| Monday, June 18, 2007 | 5.8254% | $100,000,000.00 | 0.2528 | 0.986728696 | $1,452,989.25 |

MTM Calculation (discounted back to 3/14)

| Fixed NPV as of 3/14 | Fixed NPV as of 3/13 | MTM, 3/14 relative to 3/13 |
|---|---|---|
| $1,326,137.16 | $1,451,901.86 | -$125,764.70 |

Figure 14

| Input | Value |
|---|---|
| Last Mark Date | Tuesday, June 12, 2007 |
| Today | Wednesday, June 13, 2007 |
| Forward IMM Start Date | Monday, June 18, 2007 |
| Notional Amount of Swap | $1,000,000,000.00 |
| OIS Swap Rate on June 12, 2007 | 10.0000% |
| Days between June 12, 2007 and June 18, 2007 | 6.0000 |
| OIS Swap Rate on June 13, 2007 | 10.0000% |
| Days between June 13, 2007 and June 18, 2007 | 5.0000 |
| Jun-37 CME Swap Settlement Rate on June 13, 2007 | 4.2408% |
| Jun-37 CME Swap Settlement Rate on June 12, 2007 | 2.7808% |

Figure 15

Fixed NPV Calculation as of June 12, 2007 Settlement
Applicable IMM Discount Factors

| Dates | Yield Curve Rate | Days | Daycount Fraction | IMM Discount Factor | Cumulative Discounted Daycounts |
|---|---|---|---|---|---|
| Monday, June 18, 2007 | N/A | N/A | N/A | 1 | 0 |
| Monday, September 17, 2007 | 5.3608% | 91 | 0.2528 | 0.986630261 | 0.249398205 |
| Monday, December 17, 2007 | 5.3408% | 91 | 0.2528 | 0.973537044 | 0.495486736 |
| Monday, March 17, 2008 | 5.3208% | 91 | 0.2528 | 0.960714721 | 0.738334068 |
| Monday, June 16, 2008 | 5.3008% | 91 | 0.2528 | 0.948157790 | 0.978007287 |
| Monday, September 22, 2008 | 5.2808% | 98 | 0.2722 | 0.934913531 | 1.232511526 |
| Monday, December 22, 2008 | 5.2808% | 91 | 0.2528 | 0.922887355 | 1.465796941 |
| Monday, March 16, 2009 | 5.2408% | 84 | 0.2333 | 0.912027752 | 1.678603416 |
| Monday, June 22, 2009 | 5.2208% | 98 | 0.2722 | 0.899578503 | 1.923488675 |
| Monday, September 14, 2009 | 5.2008% | 84 | 0.2333 | 0.889172291 | 2.130062354 |
| Monday, December 21, 2009 | 5.1808% | 98 | 0.2722 | 0.877227312 | 2.369763123 |
| Monday, March 22, 2010 | 5.1608% | 91 | 0.2528 | 0.866398785 | 2.588709482 |
| Monday, June 21, 2010 | 5.1408% | 91 | 0.2528 | 0.855795645 | 2.805005603 |
| Monday, September 20, 2010 | 5.1208% | 91 | 0.2528 | 0.845413426 | 3.018797331 |
| Monday, December 20, 2010 | 5.1008% | 91 | 0.2528 | 0.835247761 | 3.229929404 |
| Monday, March 21, 2011 | 5.0808% | 91 | 0.2528 | 0.825294381 | 3.438545483 |
| Monday, June 20, 2011 | 5.0608% | 91 | 0.2528 | 0.815549115 | 3.644698176 |
| Monday, September 19, 2011 | 5.0408% | 91 | 0.2528 | 0.806007884 | 3.848439058 |
| Monday, December 19, 2011 | 5.0208% | 91 | 0.2528 | 0.796666703 | 4.049818697 |
| Monday, March 19, 2012 | 5.0008% | 91 | 0.2528 | 0.787521675 | 4.248886676 |
| Monday, June 18, 2012 | 4.9808% | 91 | 0.2528 | 0.778568992 | 4.445691615 |
| Monday, September 17, 2012 | 4.9608% | 91 | 0.2528 | 0.769804930 | 4.640281105 |
| Monday, December 17, 2012 | 4.9408% | 91 | 0.2528 | 0.761225851 | 4.832702174 |
| Monday, March 18, 2013 | 4.9208% | 91 | 0.2528 | 0.752828196 | 5.023000412 |
| Monday, June 17, 2013 | 4.9008% | 91 | 0.2528 | 0.744608487 | 5.211220891 |
| Monday, September 16, 2013 | 4.8808% | 91 | 0.2528 | 0.736563323 | 5.397407731 |
| Monday, December 16, 2013 | 4.8608% | 91 | 0.2528 | 0.728689382 | 5.581604214 |
| Monday, March 17, 2014 | 4.8408% | 91 | 0.2528 | 0.720983414 | 5.763852799 |
| Monday, June 16, 2014 | 4.8208% | 91 | 0.2528 | 0.713442241 | 5.944195143 |
| Monday, September 15, 2014 | 4.8008% | 91 | 0.2528 | 0.706062757 | 6.122672118 |
| Monday, December 15, 2014 | 4.7808% | 91 | 0.2528 | 0.698841926 | 6.299323827 |
| Monday, March 16, 2015 | 4.7608% | 91 | 0.2528 | 0.691777678 | 6.474189624 |
| Monday, June 15, 2015 | 4.7408% | 91 | 0.2528 | 0.684864416 | 6.647308129 |
| Monday, September 14, 2015 | 4.7208% | 91 | 0.2528 | 0.678101906 | 6.818717245 |
| Monday, December 14, 2015 | 4.7008% | 91 | 0.2528 | 0.671486745 | 6.988454173 |
| Monday, March 14, 2016 | 4.6808% | 91 | 0.2528 | 0.665015954 | 7.156555428 |
| Monday, June 13, 2016 | 4.6608% | 91 | 0.2528 | 0.660134595 | 7.323422784 |
| Monday, September 12, 2016 | 4.6608% | 91 | 0.2528 | 0.655441313 | 7.489103782 |
| Monday, December 12, 2016 | 4.6608% | 91 | 0.2528 | 0.650932556 | 7.653645067 |
| Monday, March 13, 2017 | 4.5208% | 91 | 0.2528 | 0.646604886 | 7.817092413 |
| Monday, June 12, 2017 | 4.4808% | 91 | 0.2528 | 0.642454978 | 7.979490765 |
| Monday, September 11, 2017 | 4.4408% | 91 | 0.2528 | 0.638479614 | 8.140584213 |
| Monday, December 11, 2017 | 4.4008% | 91 | 0.2528 | 0.634675568 | 8.301316121 |
| Monday, March 12, 2018 | 4.3608% | 91 | 0.2528 | 0.631040167 | 8.460829052 |
| Monday, June 11, 2018 | 4.3208% | 91 | 0.2528 | 0.627570163 | 8.619464843 |
| Monday, September 10, 2018 | 4.2808% | 91 | 0.2528 | 0.624262856 | 8.777264521 |

Figure 16

| | | | | |
|---|---|---|---|---|
| Monday, December 10, 2018 | 4.2408% | 91 | 0.2528 | 8.934268824 |
| Monday, March 11, 2019 | 4.2008% | 91 | 0.618125552 | 9.090517227 |
| Monday, June 10, 2019 | 4.1608% | 91 | 0.615290395 | 9.246048966 |
| Monday, September 09, 2019 | 4.1208% | 91 | 0.612607607 | 9.400902555 |
| Monday, December 09, 2019 | 4.0808% | 91 | 0.61007483 | 9.555115915 |
| Monday, March 09, 2020 | 4.0408% | 91 | 0.607689784 | 9.708726388 |
| Monday, June 08, 2020 | 4.0008% | 91 | 0.605450275 | 9.861770764 |
| Monday, September 07, 2020 | 3.9608% | 91 | 0.603354188 | 10.01428529 |
| Monday, December 07, 2020 | 3.9208% | 91 | 0.601399485 | 10.16630572 |
| Monday, March 08, 2021 | 3.8808% | 91 | 0.599584206 | 10.31786728 |
| Monday, June 07, 2021 | 3.8408% | 91 | 0.597906466 | 10.46900475 |
| Monday, September 06, 2021 | 3.8008% | 91 | 0.596364450 | 10.61975243 |
| Monday, December 06, 2021 | 3.7608% | 91 | 0.594956417 | 10.77014419 |
| Monday, March 07, 2022 | 3.7208% | 91 | 0.593680697 | 10.92021348 |
| Monday, June 06, 2022 | 3.6808% | 91 | 0.592535685 | 11.06999333 |
| Monday, September 05, 2022 | 3.6408% | 91 | 0.591519847 | 11.21951641 |
| Monday, December 05, 2022 | 3.6008% | 91 | 0.59063171 | 11.36881498 |
| Monday, March 06, 2023 | 3.5608% | 91 | 0.58986987 | 11.51792097 |
| Monday, June 05, 2023 | 3.5208% | 91 | 0.589232983 | 11.66686598 |
| Monday, September 04, 2023 | 3.4808% | 91 | 0.588719767 | 11.81568125 |
| Monday, December 04, 2023 | 3.4408% | 91 | 0.588329002 | 11.96439775 |
| Monday, March 04, 2024 | 3.4008% | 91 | 0.588059527 | 12.11304613 |
| Monday, June 03, 2024 | 3.3608% | 91 | 0.587910239 | 12.26165677 |
| Monday, September 02, 2024 | 3.3208% | 91 | 0.587880093 | 12.4102598 |
| Monday, December 02, 2024 | 3.2808% | 91 | 0.587968099 | 12.55888507 |
| Monday, March 03, 2025 | 3.2408% | 91 | 0.588173324 | 12.70756221 |
| Monday, June 02, 2025 | 3.2008% | 91 | 0.588494889 | 12.85632064 |
| Monday, September 01, 2025 | 3.1608% | 91 | 0.588931969 | 13.00518956 |
| Monday, December 01, 2025 | 3.1208% | 91 | 0.58948379 | 13.15419796 |
| Monday, March 02, 2026 | 3.0808% | 91 | 0.590149633 | 13.30337467 |
| Monday, June 01, 2026 | 3.0408% | 91 | 0.590928828 | 13.45274835 |
| Monday, September 07, 2026 | 3.0008% | 98 | 0.591478234 | 13.61376187 |
| Monday, December 07, 2026 | 2.9608% | 91 | 0.592489403 | 13.76353002 |
| Monday, March 08, 2027 | 2.9208% | 91 | 0.593612098 | 13.91358197 |
| Monday, June 07, 2027 | 2.8808% | 91 | 0.59484585 | 14.06394578 |
| Monday, September 06, 2027 | 2.8408% | 91 | 0.596190239 | 14.21464942 |
| Monday, December 06, 2027 | 2.8008% | 91 | 0.597644693 | 14.36572077 |
| Monday, March 06, 2028 | 2.7608% | 91 | 0.599209484 | 14.51718761 |

Figure 17

| Date | Rate | Days | Value | Total |
|---|---|---|---|---|
| Monday, June 05, 2028 | 2.7208% | 91 | 0.600883735 | 14.66907767 |
| Monday, September 04, 2028 | 2.6808% | 91 | 0.60266741 | 14.8214186 |
| Monday, December 04, 2028 | 2.6408% | 91 | 0.604560323 | 14.97423801 |
| Monday, March 05, 2029 | 2.6008% | 91 | 0.606662329 | 15.12765349 |
| Monday, June 04, 2029 | 2.5608% | 91 | 0.608673331 | 15.28142258 |
| Monday, September 03, 2029 | 2.5908% | 91 | 0.600158486 | 15.43312931 |
| Monday, December 03, 2029 | 2.6208% | 91 | 0.591609254 | 15.58267498 |
| Monday, March 04, 2030 | 2.6508% | 91 | 0.583027796 | 15.73005145 |
| Monday, June 03, 2030 | 2.6808% | 91 | 0.574416268 | 15.87525112 |
| Monday, September 02, 2030 | 2.7108% | 91 | 0.56577682 | 16.01826693 |
| Monday, December 02, 2030 | 2.7408% | 91 | 0.557111597 | 16.15909236 |
| Monday, March 03, 2031 | 2.7708% | 91 | 0.548422734 | 16.29772144 |
| Monday, June 02, 2031 | 2.8008% | 91 | 0.539712362 | 16.43414873 |
| Monday, September 01, 2031 | 2.8308% | 91 | 0.530982601 | 16.56836933 |
| Monday, December 01, 2031 | 2.8608% | 91 | 0.522235561 | 16.70037888 |
| Monday, March 01, 2032 | 2.8908% | 91 | 0.513473344 | 16.83017353 |
| Monday, June 07, 2032 | 2.9208% | 98 | 0.504413665 | 16.96748614 |
| Monday, September 06, 2032 | 2.9508% | 91 | 0.495626557 | 17.09276952 |
| Monday, December 06, 2032 | 2.9808% | 91 | 0.486830555 | 17.21582946 |
| Monday, March 07, 2033 | 3.0108% | 91 | 0.478027713 | 17.33666425 |
| Monday, June 06, 2033 | 3.0408% | 91 | 0.469220069 | 17.45527265 |
| Monday, September 05, 2033 | 3.0708% | 91 | 0.46040965 | 17.57165398 |
| Monday, December 05, 2033 | 3.1008% | 91 | 0.451598464 | 17.68580804 |
| Monday, March 06, 2034 | 3.1308% | 91 | 0.442788508 | 17.79773513 |
| Monday, June 05, 2034 | 3.1608% | 91 | 0.433981776 | 17.90743608 |
| Monday, September 04, 2034 | 3.1908% | 91 | 0.425180182 | 18.01491218 |
| Monday, December 04, 2034 | 3.2208% | 91 | 0.416385718 | 18.12016523 |
| Monday, March 05, 2035 | 3.2508% | 91 | 0.407600295 | 18.22319753 |
| Monday, June 04, 2035 | 3.2808% | 91 | 0.39882582 | 18.32401184 |
| Monday, September 03, 2035 | 3.3108% | 91 | 0.390064182 | 18.42261139 |
| Monday, December 03, 2035 | 3.3408% | 91 | 0.381317251 | 18.51899992 |
| Monday, March 03, 2036 | 3.4908% | 91 | 0.350446423 | 18.60758499 |
| Monday, June 02, 2036 | 3.6408% | 91 | 0.319593782 | 18.68837119 |
| Monday, September 01, 2036 | 3.7908% | 91 | 0.288793915 | 18.76137188 |
| Monday, December 01, 2036 | 3.9408% | 91 | 0.258080992 | 18.82660902 |
| Monday, March 02, 2037 | 4.0908% | 91 | 0.227488701 | 18.88411311 |
| Monday, June 01, 2037 | 4.2408% | 91 | 0.197050193 | 18.93392302 |

Figure 18

Individual Coupon Value Factors

| Dates | Days | Daycount Fraction | IMM Discount Factor | Spot Discount Factor | Coupon Value Factor |
|---|---|---|---|---|---|
| Monday, September 17, 2007 | 91 | 0.2528 | 0.986630261 | 0.985261842 | 0.24905230 |
| Monday, December 17, 2007 | 91 | 0.2528 | 0.973537044 | 0.972186785 | 0.24574722 |
| Monday, March 17, 2008 | 91 | 0.2528 | 0.960714721 | 0.959382246 | 0.24251051 |
| Monday, June 16, 2008 | 91 | 0.2528 | 0.948815779 | 0.946842273 | 0.23934080 |
| Monday, September 22, 2008 | 98 | 0.2722 | 0.934913531 | 0.933616841 | 0.25416125 |
| Monday, December 22, 2008 | 91 | 0.2528 | 0.922887356 | 0.921607344 | 0.23296186 |
| Monday, March 16, 2009 | 84 | 0.2333 | 0.912027752 | 0.910762804 | 0.21251132 |
| Monday, June 22, 2009 | 98 | 0.2722 | 0.899578503 | 0.898330822 | 0.24454561 |
| Monday, September 14, 2009 | 84 | 0.2333 | 0.889017291 | 0.887939066 | 0.20718592 |
| Monday, December 21, 2009 | 98 | 0.2722 | 0.877227312 | 0.876010631 | 0.23845956 |
| Monday, March 22, 2010 | 91 | 0.2528 | 0.866398785 | 0.865197122 | 0.21870261 |
| Monday, June 21, 2010 | 91 | 0.2528 | 0.855705645 | 0.854608689 | 0.21602009 |
| Monday, September 20, 2010 | 91 | 0.2528 | 0.845413426 | 0.844240087 | 0.21340533 |
| Monday, December 20, 2010 | 91 | 0.2528 | 0.835247761 | 0.834080304 | 0.21083924 |
| Monday, March 21, 2011 | 91 | 0.2528 | 0.825294381 | 0.824149729 | 0.20832674 |
| Monday, June 20, 2011 | 91 | 0.2528 | 0.815549115 | 0.814417979 | 0.20580677 |
| Monday, September 19, 2011 | 91 | 0.2528 | 0.806007884 | 0.804889981 | 0.20345830 |
| Monday, December 19, 2011 | 91 | 0.2528 | 0.796666703 | 0.795561766 | 0.20110033 |
| Monday, March 19, 2012 | 91 | 0.2528 | 0.787521675 | 0.786429412 | 0.19879188 |
| Monday, June 18, 2012 | 91 | 0.2528 | 0.778568992 | 0.777489146 | 0.19653108 |
| Monday, September 17, 2012 | 91 | 0.2528 | 0.769800493 | 0.768735724 | 0.19431969 |
| Monday, December 17, 2012 | 91 | 0.2528 | 0.761225851 | 0.760170059 | 0.19215410 |
| Monday, March 18, 2013 | 91 | 0.2528 | 0.752828196 | 0.751784051 | 0.19003430 |
| Monday, June 17, 2013 | 91 | 0.2528 | 0.744608487 | 0.743575742 | 0.18795942 |
| Monday, September 16, 2013 | 91 | 0.2528 | 0.736563323 | 0.735541738 | 0.18592861 |
| Monday, December 16, 2013 | 91 | 0.2528 | 0.728680382 | 0.727678717 | 0.18394101 |
| Monday, March 17, 2014 | 91 | 0.2528 | 0.720963414 | 0.719963437 | 0.18199561 |
| Monday, June 16, 2014 | 91 | 0.2528 | 0.713442241 | 0.712452723 | 0.18009222 |
| Monday, September 15, 2014 | 91 | 0.2528 | 0.705062757 | 0.705083474 | 0.17822943 |
| Monday, December 15, 2014 | 91 | 0.2528 | 0.698841926 | 0.697872659 | 0.17640670 |
| Monday, March 16, 2015 | 91 | 0.2528 | 0.691776.78 | 0.690817312 | 0.17402326 |
| Monday, June 15, 2015 | 91 | 0.2528 | 0.684854416 | 0.683914535 | 0.17287840 |
| Monday, September 14, 2015 | 91 | 0.2528 | 0.678101996 | 0.677161494 | 0.17171738 |
| Monday, December 14, 2015 | 91 | 0.2528 | 0.671486740 | 0.670555419 | 0.16950151 |
| Monday, March 14, 2016 | 91 | 0.2528 | 0.665015954 | 0.664093601 | 0.16788810 |
| Monday, June 13, 2016 | 91 | 0.2528 | 0.660134505 | 0.659219013 | 0.16663592 |
| Monday, September 12, 2016 | 91 | 0.2528 | 0.655441313 | 0.654632241 | 0.16545121 |
| Monday, December 12, 2016 | 91 | 0.2528 | 0.650932556 | 0.650029737 | 0.16431307 |
| Monday, March 13, 2017 | 91 | 0.2528 | 0.646604885 | 0.645708069 | 0.16322055 |
| Monday, June 12, 2017 | 91 | 0.2528 | 0.642454978 | 0.641563917 | 0.16217310 |
| Monday, September 11, 2017 | 91 | 0.2528 | 0.638479614 | 0.637594067 | 0.16116991 |
| Monday, December 11, 2017 | 91 | 0.2528 | 0.634675568 | 0.633795499 | 0.16020039 |
| Monday, March 12, 2018 | 91 | 0.2528 | 0.631040167 | 0.630164938 | 0.15929169 |
| Monday, June 11, 2018 | 91 | 0.2528 | 0.627670163 | 0.626699747 | 0.15841577 |
| Monday, September 10, 2018 | 91 | 0.2528 | 0.624262850 | 0.623397027 | 0.15758092 |
| Monday, December 10, 2018 | 91 | 0.2528 | 0.621115528 | 0.620254064 | 0.15678644 |

Figure 19

| | | | | |
|---|---|---|---|---|
| Monday, March 11, 2019 | | 0.2528 | 0.618125552 | 0.617268235 | 0.15603169 |
| Monday, June 10, 2019 | 91 | 0.2528 | 0.6152903395 | 0.61443701 | 0.15531602 |
| Monday, September 09, 2019 | 91 | 0.2528 | 0.612607607 | 0.611757944 | 0.15463881 |
| Monday, December 09, 2019 | 91 | 0.2528 | 0.61007483 | 0.609228679 | 0.15399947 |
| Monday, March 09, 2020 | 91 | 0.2528 | 0.607689784 | 0.606846941 | 0.15339742 |
| Monday, June 08, 2020 | 91 | 0.2528 | 0.606450275 | 0.604610538 | 0.15283211 |
| Monday, September 07, 2020 | 91 | 0.2528 | 0.603354188 | 0.602517358 | 0.15230300 |
| Monday, December 07, 2020 | 91 | 0.2528 | 0.601399485 | 0.600565367 | 0.15180958 |
| Monday, March 08, 2021 | 91 | 0.2528 | 0.599584206 | 0.598752606 | 0.15135135 |
| Monday, June 07, 2021 | 91 | 0.2528 | 0.597906466 | 0.597077192 | 0.15092785 |
| Monday, September 06, 2021 | 91 | 0.2528 | 0.59636445 | 0.595537314 | 0.15053860 |
| Monday, December 06, 2021 | 91 | 0.2528 | 0.594956417 | 0.594131235 | 0.15018317 |
| Monday, March 07, 2022 | 91 | 0.2528 | 0.593680697 | 0.592857284 | 0.14986115 |
| Monday, June 06, 2022 | 91 | 0.2528 | 0.592535685 | 0.591713861 | 0.14957211 |
| Monday, September 05, 2022 | 91 | 0.2528 | 0.591519847 | 0.590699431 | 0.14931569 |
| Monday, December 05, 2022 | 91 | 0.2528 | 0.59063171 | 0.589812526 | 0.14909150 |
| Monday, March 06, 2023 | 91 | 0.2528 | 0.58986987 | 0.589051743 | 0.14889919 |
| Monday, June 05, 2023 | 91 | 0.2528 | 0.589232983 | 0.588415739 | 0.14873842 |
| Monday, September 04, 2023 | 91 | 0.2528 | 0.588719767 | 0.587903235 | 0.14860887 |
| Monday, December 04, 2023 | 91 | 0.2528 | 0.588329002 | 0.587513012 | 0.14851023 |
| Monday, March 04, 2024 | 91 | 0.2528 | 0.588059527 | 0.587243911 | 0.14844221 |
| Monday, June 03, 2024 | 91 | 0.2528 | 0.587910239 | 0.58709483 | 0.14840453 |
| Monday, September 02, 2024 | 91 | 0.2528 | 0.587880093 | 0.587064725 | 0.14839692 |
| Monday, December 02, 2024 | 91 | 0.2528 | 0.587968099 | 0.587152609 | 0.14841913 |
| Monday, March 03, 2025 | 91 | 0.2528 | 0.588173324 | 0.587357549 | 0.14847094 |
| Monday, June 02, 2025 | 91 | 0.2528 | 0.584494889 | 0.587678669 | 0.14855211 |
| Monday, September 01, 2025 | 91 | 0.2528 | 0.588931969 | 0.588115142 | 0.14866244 |
| Monday, December 01, 2025 | 98 | 0.2722 | 0.58948379 | 0.588666198 | 0.14880173 |
| Monday, March 02, 2026 | 91 | 0.2528 | 0.590149633 | 0.589331118 | 0.14896981 |
| Monday, June 01, 2026 | 91 | 0.2528 | 0.590928828 | 0.590109232 | 0.14916650 |
| Monday, September 07, 2026 | 91 | 0.2528 | 0.591478234 | 0.590657876 | 0.16079020 |
| Monday, December 07, 2026 | 91 | 0.2528 | 0.592489403 | 0.591667643 | 0.14956043 |
| Monday, March 08, 2027 | 91 | 0.2528 | 0.593612098 | 0.59278878 | 0.14984383 |
| Monday, June 07, 2027 | 91 | 0.2528 | 0.59484585 | 0.594020821 | 0.15015526 |
| Monday, September 06, 2027 | 91 | 0.2528 | 0.596190239 | 0.595363346 | 0.15049462 |
| Monday, December 06, 2027 | 91 | 0.2528 | 0.597644893 | 0.596815982 | 0.15086182 |
| Monday, March 06, 2028 | 91 | 0.2528 | 0.599209484 | 0.598378403 | 0.15125676 |
| Monday, June 05, 2028 | 91 | 0.2528 | 0.600883735 | 0.600050332 | 0.15167939 |
| Monday, September 04, 2028 | 91 | 0.2528 | 0.60266741 | 0.601831533 | 0.15212964 |
| Monday, December 04, 2028 | 91 | 0.2528 | 0.604560323 | 0.60372182 | 0.15260746 |
| Monday, March 05, 2029 | 91 | 0.2528 | 0.606562329 | 0.60572105 | 0.15311282 |
| Monday, June 04, 2029 | 91 | 0.2528 | 0.608673331 | 0.607829123 | 0.15364570 |
| Monday, September 03, 2029 | 91 | 0.2528 | 0.600158486 | 0.599326088 | 0.15149632 |

Figure 20

| | | | | |
|---|---|---|---|---|
| Monday, December 03, 2029 | 91 | 0.2528 | 0.591609254 | 0.590788714 | 0.14933826 |
| Monday, March 04, 2030 | 91 | 0.2528 | 0.583027796 | 0.582219158 | 0.14717207 |
| Monday, June 03, 2030 | 91 | 0.2528 | 0.574416268 | 0.573619574 | 0.14499828 |
| Monday, September 02, 2030 | 91 | 0.2528 | 0.56577682 | 0.564992109 | 0.14281745 |
| Monday, December 02, 2030 | 91 | 0.2528 | 0.557111597 | 0.556338904 | 0.14063011 |
| Monday, March 03, 2031 | 91 | 0.2528 | 0.548422734 | 0.547662093 | 0.13843681 |
| Monday, June 02, 2031 | 91 | 0.2528 | 0.539712362 | 0.538963802 | 0.13623807 |
| Monday, September 01, 2031 | 91 | 0.2528 | 0.530982601 | 0.530246148 | 0.13403444 |
| Monday, December 01, 2031 | 91 | 0.2528 | 0.522235561 | 0.52151124 | 0.13182645 |
| Monday, March 01, 2032 | 91 | 0.2528 | 0.513473344 | 0.512761175 | 0.12961463 |
| Monday, June 07, 2032 | 98 | 0.2722 | 0.504413665 | 0.503714062 | 0.13712216 |
| Monday, September 06, 2032 | 91 | 0.2528 | 0.495626557 | 0.494939142 | 0.12510962 |
| Monday, December 06, 2032 | 91 | 0.2528 | 0.486830555 | 0.48615534 | 0.12288927 |
| Monday, March 07, 2033 | 91 | 0.2528 | 0.478027713 | 0.477364706 | 0.12066719 |
| Monday, June 06, 2033 | 91 | 0.2528 | 0.469220069 | 0.468569279 | 0.11844390 |
| Monday, September 05, 2033 | 91 | 0.2528 | 0.46040965 | 0.459771079 | 0.11621991 |
| Monday, December 05, 2033 | 91 | 0.2528 | 0.451598464 | 0.450972114 | 0.11399573 |
| Monday, March 06, 2034 | 91 | 0.2528 | 0.442788508 | 0.442174377 | 0.11177186 |
| Monday, June 05, 2034 | 91 | 0.2528 | 0.43398176 | 0.433379844 | 0.10954879 |
| Monday, September 04, 2034 | 91 | 0.2528 | 0.425180182 | 0.424590473 | 0.10732704 |
| Monday, December 04, 2034 | 91 | 0.2528 | 0.416385718 | 0.415808207 | 0.10510707 |
| Monday, March 05, 2035 | 91 | 0.2528 | 0.407600295 | 0.407034968 | 0.10288939 |
| Monday, June 04, 2035 | 91 | 0.2528 | 0.398982582 | 0.398272663 | 0.10067448 |
| Monday, September 03, 2035 | 91 | 0.2528 | 0.390064182 | 0.389523178 | 0.09846280 |
| Monday, December 03, 2035 | 91 | 0.2528 | 0.381317251 | 0.380788378 | 0.09625484 |
| Monday, March 03, 2036 | 91 | 0.2528 | 0.350446423 | 0.349960367 | 0.08846220 |
| Monday, June 02, 2036 | 91 | 0.2528 | 0.319593782 | 0.319150517 | 0.08067416 |
| Monday, September 01, 2036 | 91 | 0.2528 | 0.288793915 | 0.288393368 | 0.07289943 |
| Monday, December 01, 2036 | 91 | 0.2528 | 0.258080992 | 0.257723043 | 0.06514666 |
| Monday, March 02, 2037 | 91 | 0.2528 | 0.227488701 | 0.227173183 | 0.05742433 |
| Monday, June 01, 2037 | 91 | 0.2528 | 0.197050193 | 0.196776891 | 0.04974083 |

Fixed NPV on Jun-37 CME Swap as of 6/12/2007

| June 12th Fixed Rate | Notional | Swap Value Factor | June 12th Fixed NPV |
|---|---|---|---|
| 2.7808% | $1,000,000,000.00 | 18.9076623740 | $525,784,275.30 |

Figure 21

Fixed NPV Calculation as of June 13, 2007 Settlement
Applicable IMM Discount Factors

| Dates | Yield Curve Rate | Days | Daycount Fraction | IMM Discount Factor | Cumulative Discounted Daycounts |
|---|---|---|---|---|---|
| Monday, June 18, 2007 | N/A | N/A | N/A | 1 | 0 |
| Monday, September 17, 2007 | 5.3608% | 91 | 0.2528 | 0.986630261 | 0.249398205 |
| Monday, December 17, 2007 | 5.3408% | 91 | 0.2528 | 0.973537044 | 0.495486736 |
| Monday, March 17, 2008 | 5.3208% | 91 | 0.2528 | 0.960714721 | 0.738334068 |
| Monday, June 16, 2008 | 5.3008% | 91 | 0.2528 | 0.94815779 | 0.978007287 |
| Monday, September 22, 2008 | 5.2808% | 98 | 0.2722 | 0.934913531 | 1.232511526 |
| Monday, December 22, 2008 | 5.2608% | 91 | 0.2528 | 0.922887356 | 1.465796941 |
| Monday, March 16, 2009 | 5.2408% | 84 | 0.2333 | 0.912027752 | 1.678603416 |
| Monday, June 22, 2009 | 5.2208% | 98 | 0.2722 | 0.899578503 | 1.923486675 |
| Monday, September 14, 2009 | 5.2008% | 84 | 0.2333 | 0.88917291 | 2.130962354 |
| Monday, December 21, 2009 | 5.1808% | 98 | 0.2722 | 0.877227312 | 2.369763123 |
| Monday, March 22, 2010 | 5.1608% | 91 | 0.2528 | 0.866398785 | 2.588789482 |
| Monday, June 21, 2010 | 5.1408% | 91 | 0.2528 | 0.857595645 | 2.805095603 |
| Monday, September 20, 2010 | 5.1208% | 91 | 0.2528 | 0.845413426 | 3.018797331 |
| Monday, December 20, 2010 | 5.1008% | 91 | 0.2528 | 0.835247761 | 3.229929404 |
| Monday, March 21, 2011 | 5.0808% | 91 | 0.2528 | 0.825294381 | 3.438545483 |
| Monday, June 20, 2011 | 5.0608% | 91 | 0.2528 | 0.815549115 | 3.644698176 |
| Monday, September 19, 2011 | 5.0408% | 91 | 0.2528 | 0.806007884 | 3.848439058 |
| Monday, December 19, 2011 | 5.0208% | 91 | 0.2528 | 0.796666703 | 4.049818697 |
| Monday, March 19, 2012 | 5.0008% | 91 | 0.2528 | 0.787521675 | 4.248886678 |
| Monday, June 18, 2012 | 4.9808% | 91 | 0.2528 | 0.778568992 | 4.445691615 |
| Monday, September 17, 2012 | 4.9608% | 91 | 0.2528 | 0.769805493 | 4.640281195 |
| Monday, December 17, 2012 | 4.9408% | 91 | 0.2528 | 0.761225851 | 4.832702174 |
| Monday, March 18, 2013 | 4.9208% | 91 | 0.2528 | 0.752828196 | 5.023000412 |
| Monday, June 17, 2013 | 4.9008% | 91 | 0.2528 | 0.744608487 | 5.211220891 |
| Monday, September 16, 2013 | 4.8808% | 91 | 0.2528 | 0.736563323 | 5.397407731 |
| Monday, December 16, 2013 | 4.8608% | 91 | 0.2528 | 0.728689382 | 5.581604214 |
| Monday, March 17, 2014 | 4.8408% | 91 | 0.2528 | 0.720983414 | 5.763852799 |
| Monday, June 16, 2014 | 4.8208% | 91 | 0.2528 | 0.713442241 | 5.944195143 |
| Monday, September 15, 2014 | 4.8008% | 91 | 0.2528 | 0.706062757 | 6.122672118 |
| Monday, December 15, 2014 | 4.7808% | 91 | 0.2528 | 0.698841926 | 6.299323827 |
| Monday, March 16, 2015 | 4.7608% | 91 | 0.2528 | 0.69177678 | 6.474189624 |
| Monday, June 15, 2015 | 4.7408% | 91 | 0.2528 | 0.684864416 | 6.647308129 |
| Monday, September 14, 2015 | 4.7208% | 91 | 0.2528 | 0.678101996 | 6.818717245 |
| Monday, December 14, 2015 | 4.7008% | 91 | 0.2528 | 0.671486746 | 6.988454173 |
| Monday, March 14, 2016 | 4.6808% | 91 | 0.2528 | 0.665015954 | 7.156555428 |
| Monday, June 13, 2016 | 4.6608% | 91 | 0.2528 | 0.660134595 | 7.323422784 |
| Monday, September 12, 2016 | 4.6008% | 91 | 0.2528 | 0.655441313 | 7.489103782 |
| Monday, December 12, 2016 | 4.5608% | 91 | 0.2528 | 0.650932556 | 7.653645067 |
| Monday, March 13, 2017 | 4.5208% | 91 | 0.2528 | 0.646604886 | 7.817092413 |
| Monday, June 12, 2017 | 4.4808% | 91 | 0.2528 | 0.642454978 | 7.979490755 |
| Monday, September 11, 2017 | 4.4408% | 91 | 0.2528 | 0.638479614 | 8.140584213 |
| Monday, March 12, 2018 | 4.3608% | 91 | 0.2528 | 0.63167568 | 8.301316121 |
| Monday, June 11, 2018 | 4.3208% | 91 | 0.2528 | 0.631040167 | 8.460829052 |
| | | | | 0.627570163 | 8.619464843 |

Figure 22

| | | | | |
|---|---|---|---|---|
| Monday, September 10, 2018 | 4.2808% | 91 | 0.624262856 | 8.777264621 |
| Monday, December 10, 2018 | 4.2408% | 91 | 0.621115528 | 8.934268824 |
| Monday, March 11, 2019 | 4.2008% | 91 | 0.618125552 | 9.090517227 |
| Monday, June 10, 2019 | 4.1608% | 91 | 0.615290395 | 9.246048966 |
| Monday, September 09, 2019 | 4.1208% | 91 | 0.612607607 | 9.400902555 |
| Monday, December 09, 2019 | 4.0808% | 91 | 0.61007483 | 9.555115915 |
| Monday, March 09, 2020 | 4.0408% | 91 | 0.607689784 | 9.708726388 |
| Monday, June 08, 2020 | 4.0008% | 91 | 0.605450275 | 9.861770764 |
| Monday, September 07, 2020 | 3.9608% | 91 | 0.603354188 | 10.01428529 |
| Monday, December 07, 2020 | 3.9208% | 91 | 0.601399485 | 10.16630572 |
| Monday, March 08, 2021 | 3.8808% | 91 | 0.599584206 | 10.31786728 |
| Monday, June 07, 2021 | 3.8408% | 91 | 0.597906466 | 10.46900475 |
| Monday, September 06, 2021 | 3.8008% | 91 | 0.59636445 | 10.61975243 |
| Monday, December 06, 2021 | 3.7608% | 91 | 0.594956417 | 10.77014419 |
| Monday, March 07, 2022 | 3.7208% | 91 | 0.593680697 | 10.92021348 |
| Monday, June 06, 2022 | 3.6808% | 91 | 0.592535685 | 11.06999333 |
| Monday, September 05, 2022 | 3.6408% | 91 | 0.591519847 | 11.21951641 |
| Monday, December 05, 2022 | 3.6008% | 91 | 0.59063171 | 11.36881498 |
| Monday, March 06, 2023 | 3.5608% | 91 | 0.58986987 | 11.51792097 |
| Monday, June 05, 2023 | 3.5208% | 91 | 0.589232983 | 11.66686598 |
| Monday, September 04, 2023 | 3.4808% | 91 | 0.588719767 | 11.81566125 |
| Monday, December 04, 2023 | 3.4408% | 91 | 0.588329002 | 11.96439775 |
| Monday, March 04, 2024 | 3.4008% | 91 | 0.588059527 | 12.11304613 |
| Monday, June 03, 2024 | 3.3608% | 91 | 0.587910239 | 12.26165677 |
| Monday, September 02, 2024 | 3.3208% | 91 | 0.587880093 | 12.4102598 |
| Monday, December 02, 2024 | 3.2808% | 91 | 0.587968099 | 12.55888507 |
| Monday, March 03, 2025 | 3.2408% | 91 | 0.588173324 | 12.70756221 |
| Monday, June 02, 2025 | 3.2008% | 91 | 0.588494889 | 12.85632064 |
| Monday, September 01, 2025 | 3.1608% | 91 | 0.588931969 | 13.00518956 |
| Monday, December 01, 2025 | 3.1208% | 91 | 0.58948379 | 13.15419796 |
| Monday, March 02, 2026 | 3.0808% | 91 | 0.590149633 | 13.30337467 |
| Monday, June 01, 2026 | 3.0408% | 91 | 0.590928828 | 13.45274835 |
| Monday, September 07, 2026 | 3.0008% | 98 | 0.591147234 | 13.61376187 |
| Monday, December 07, 2026 | 2.9608% | 91 | 0.592489403 | 13.76353002 |
| Monday, March 08, 2027 | 2.9208% | 91 | 0.593612098 | 13.91358197 |
| Monday, June 07, 2027 | 2.8808% | 91 | 0.59484585 | 14.06394578 |
| Monday, September 06, 2027 | 2.8408% | 91 | 0.596190239 | 14.21464942 |
| Monday, December 06, 2027 | 2.8008% | 91 | 0.597644893 | 14.36572077 |
| Monday, March 06, 2028 | 2.7608% | 91 | 0.599209484 | 14.51718761 |
| Monday, June 05, 2028 | 2.7208% | 91 | 0.600883735 | 14.66907767 |
| Monday, September 04, 2028 | 2.6808% | 91 | 0.60266741 | 14.8214186 |
| Monday, December 04, 2028 | 2.6408% | 91 | 0.604560323 | 14.97423801 |
| Monday, March 05, 2029 | 2.6008% | 91 | 0.606562329 | 15.12756349 |

Figure 23

| | | | | |
|---|---|---|---|---|
| Monday, June 04, 2029 | 2.5608% | 91 | 0.608673331 | 15.28142258 |
| Monday, September 03, 2029 | 2.5908% | 91 | 0.600158486 | 15.43312931 |
| Monday, December 03, 2029 | 2.6208% | 91 | 0.591609254 | 15.58267498 |
| Monday, March 04, 2030 | 2.6508% | 91 | 0.583027796 | 15.73005145 |
| Monday, June 03, 2030 | 2.6808% | 91 | 0.574416268 | 15.87525112 |
| Monday, September 02, 2030 | 2.7108% | 91 | 0.56577682 | 16.01826693 |
| Monday, December 02, 2030 | 2.7408% | 91 | 0.557111597 | 16.15909236 |
| Monday, March 03, 2031 | 2.7708% | 91 | 0.548422734 | 16.29772144 |
| Monday, June 02, 2031 | 2.8008% | 91 | 0.539712362 | 16.43414873 |
| Monday, September 01, 2031 | 2.8308% | 91 | 0.530982601 | 16.56836933 |
| Monday, December 01, 2031 | 2.8608% | 91 | 0.522235561 | 16.70037888 |
| Monday, March 01, 2032 | 2.8908% | 91 | 0.513473344 | 16.83017353 |
| Monday, June 07, 2032 | 2.9208% | 98 | 0.504413665 | 16.96748614 |
| Monday, September 06, 2032 | 2.9508% | 91 | 0.495626557 | 17.09276952 |
| Monday, December 06, 2032 | 2.9808% | 91 | 0.486830555 | 17.21582946 |
| Monday, March 07, 2033 | 3.0108% | 91 | 0.478027713 | 17.33666425 |
| Monday, June 06, 2033 | 3.0408% | 91 | 0.469220069 | 17.45527265 |
| Monday, September 05, 2033 | 3.0708% | 91 | 0.46040965 | 17.57165398 |
| Monday, December 05, 2033 | 3.1008% | 91 | 0.451598464 | 17.68580804 |
| Monday, March 06, 2034 | 3.1308% | 91 | 0.442788508 | 17.79773513 |
| Monday, June 05, 2034 | 3.1608% | 91 | 0.43398176 | 17.90743608 |
| Monday, September 04, 2034 | 3.1908% | 91 | 0.425180182 | 18.01491218 |
| Monday, December 04, 2034 | 3.2208% | 91 | 0.416385718 | 18.12016523 |
| Monday, March 05, 2035 | 3.2508% | 91 | 0.407600295 | 18.22319753 |
| Monday, June 04, 2035 | 3.2808% | 91 | 0.39882582 | 18.32401184 |
| Monday, September 03, 2035 | 3.3108% | 91 | 0.390064182 | 18.42261139 |
| Monday, December 03, 2035 | 3.3408% | 91 | 0.381317251 | 18.51899992 |
| Monday, March 03, 2036 | 3.4908% | 91 | 0.350446423 | 18.60758499 |
| Monday, June 02, 2036 | 3.6408% | 91 | 0.319593782 | 18.68837119 |
| Monday, September 01, 2036 | 3.7908% | 91 | 0.288793915 | 18.76137188 |
| Monday, December 01, 2036 | 3.9408% | 91 | 0.258080992 | 18.82660902 |
| Monday, March 02, 2037 | 4.0908% | 91 | 0.227488701 | 18.88411311 |
| Monday, June 01, 2037 | 4.2408% | 91 | 0.197050193 | 18.93392302 |

Figure 24

Individual Coupon Value Factors

| Dates | Days | Daycount Fraction | IMM Discount Factor | Spot Discount Factor | Coupon Value Factor |
|---|---|---|---|---|---|
| Monday, September 17, 2007 | 91 | 0.2528 | 0.986630261 | 0.985261842 | 0.24905230 |
| Monday, December 17, 2007 | 91 | 0.2528 | 0.973537044 | 0.972186785 | 0.24574722 |
| Monday, March 17, 2008 | 91 | 0.2528 | 0.960714721 | 0.959382246 | 0.24251051 |
| Monday, June 16, 2008 | 91 | 0.2528 | 0.948115779 | 0.946842273 | 0.23934080 |
| Monday, September 22, 2008 | 98 | 0.2722 | 0.934913531 | 0.933616841 | 0.25415125 |
| Monday, December 22, 2008 | 91 | 0.2528 | 0.922687355 | 0.921607344 | 0.23296186 |
| Monday, March 16, 2009 | 84 | 0.2333 | 0.912027752 | 0.910762804 | 0.21251132 |
| Monday, June 22, 2009 | 98 | 0.2722 | 0.899578503 | 0.898330822 | 0.24454561 |
| Monday, September 14, 2009 | 84 | 0.2333 | 0.889172291 | 0.887939966 | 0.20718592 |
| Monday, December 21, 2009 | 98 | 0.2722 | 0.877227312 | 0.876010631 | 0.23846956 |
| Monday, March 22, 2010 | 91 | 0.2528 | 0.866398785 | 0.865197122 | 0.21870261 |
| Monday, June 21, 2010 | 91 | 0.2528 | 0.855795645 | 0.854608689 | 0.21602609 |
| Monday, September 20, 2010 | 91 | 0.2528 | 0.845413426 | 0.844240087 | 0.21340533 |
| Monday, December 20, 2010 | 91 | 0.2528 | 0.835247761 | 0.834089304 | 0.21083924 |
| Monday, March 21, 2011 | 91 | 0.2528 | 0.825294381 | 0.824149729 | 0.20832674 |
| Monday, June 20, 2011 | 91 | 0.2528 | 0.815549115 | 0.814417979 | 0.20586677 |
| Monday, September 19, 2011 | 91 | 0.2528 | 0.806007884 | 0.804889981 | 0.20345830 |
| Monday, December 19, 2011 | 91 | 0.2528 | 0.796666703 | 0.795561756 | 0.20110033 |
| Monday, March 19, 2012 | 91 | 0.2528 | 0.787521675 | 0.786429412 | 0.19879188 |
| Monday, June 18, 2012 | 91 | 0.2528 | 0.778568992 | 0.777489146 | 0.19653198 |
| Monday, September 17, 2012 | 91 | 0.2528 | 0.769805493 | 0.76873724 | 0.19431969 |
| Monday, December 17, 2012 | 91 | 0.2528 | 0.761225851 | 0.760170059 | 0.19215410 |
| Monday, March 18, 2013 | 91 | 0.2528 | 0.752828196 | 0.751784051 | 0.19003430 |
| Monday, June 17, 2013 | 91 | 0.2528 | 0.744608487 | 0.743575742 | 0.18795942 |
| Monday, September 16, 2013 | 91 | 0.2528 | 0.736563323 | 0.735541738 | 0.18592861 |
| Monday, December 16, 2013 | 91 | 0.2528 | 0.728689382 | 0.727678717 | 0.18394101 |
| Monday, March 17, 2014 | 91 | 0.2528 | 0.720983414 | 0.719983437 | 0.18199581 |
| Monday, June 16, 2014 | 91 | 0.2528 | 0.713442241 | 0.712452723 | 0.18009222 |
| Monday, September 15, 2014 | 91 | 0.2528 | 0.706062757 | 0.705083474 | 0.17822943 |
| Monday, December 15, 2014 | 91 | 0.2528 | 0.698841926 | 0.697872659 | 0.17640670 |
| Monday, March 16, 2015 | 91 | 0.2528 | 0.691777678 | 0.690817312 | 0.17462326 |
| Monday, June 15, 2015 | 91 | 0.2528 | 0.684864416 | 0.683914535 | 0.17287840 |
| Monday, September 14, 2015 | 91 | 0.2528 | 0.678101996 | 0.677161494 | 0.17117138 |
| Monday, December 14, 2015 | 91 | 0.2528 | 0.671486746 | 0.670555419 | 0.16950151 |
| Monday, March 14, 2016 | 91 | 0.2528 | 0.665015954 | 0.664093601 | 0.16786810 |
| Monday, June 13, 2016 | 91 | 0.2528 | 0.660134595 | 0.659219013 | 0.16663592 |

Figure 25

| | | | | |
|---|---|---|---|---|
| Monday, September 12, 2016 | | 91 | 0.2528 | 0.655441313 | 0.655432241 | 0.16545121 |
| Monday, December 12, 2016 | | 91 | 0.2528 | 0.650932556 | 0.650029737 | 0.16431307 |
| Monday, March 13, 2017 | | 91 | 0.2528 | 0.646604886 | 0.645708069 | 0.16322065 |
| Monday, June 12, 2017 | | 91 | 0.2528 | 0.642454978 | 0.641563917 | 0.16217310 |
| Monday, September 11, 2017 | | 91 | 0.2528 | 0.638479614 | 0.637594067 | 0.16116961 |
| Monday, December 11, 2017 | | 91 | 0.2528 | 0.634671568 | 0.633795409 | 0.16020939 |
| Monday, March 12, 2018 | | 91 | 0.2528 | 0.631040167 | 0.630164938 | 0.15929169 |
| Monday, June 11, 2018 | | 91 | 0.2528 | 0.627570163 | 0.626699747 | 0.15841577 |
| Monday, September 10, 2018 | | 91 | 0.2528 | 0.624262856 | 0.623397027 | 0.15758092 |
| Monday, December 10, 2018 | | 91 | 0.2528 | 0.621115528 | 0.620254064 | 0.15678644 |
| Monday, March 11, 2019 | | 91 | 0.2528 | 0.618125552 | 0.617268235 | 0.15603169 |
| Monday, June 10, 2019 | | 91 | 0.2528 | 0.615290395 | 0.61443701 | 0.15531602 |
| Monday, September 09, 2019 | | 91 | 0.2528 | 0.612607607 | 0.611757944 | 0.15463881 |
| Monday, December 09, 2019 | | 91 | 0.2528 | 0.61007483 | 0.609228679 | 0.15399947 |
| Monday, March 09, 2020 | | 91 | 0.2528 | 0.607689784 | 0.606846941 | 0.15339742 |
| Monday, June 08, 2020 | | 91 | 0.2528 | 0.605450275 | 0.604610538 | 0.15283211 |
| Monday, September 07, 2020 | | 91 | 0.2528 | 0.603354188 | 0.602517358 | 0.15230300 |
| Monday, December 07, 2020 | | 91 | 0.2528 | 0.601399485 | 0.600565367 | 0.15180958 |
| Monday, March 08, 2021 | | 91 | 0.2528 | 0.599584206 | 0.598752606 | 0.15135135 |
| Monday, June 07, 2021 | | 91 | 0.2528 | 0.597906466 | 0.597077192 | 0.15092785 |
| Monday, September 06, 2021 | | 91 | 0.2528 | 0.59636445 | 0.595537314 | 0.15053860 |
| Monday, December 06, 2021 | | 91 | 0.2528 | 0.594956417 | 0.594131235 | 0.15018317 |
| Monday, March 07, 2022 | | 91 | 0.2528 | 0.593680697 | 0.592857284 | 0.14986115 |
| Monday, June 06, 2022 | | 91 | 0.2528 | 0.592535685 | 0.591713861 | 0.14957211 |
| Monday, September 05, 2022 | | 91 | 0.2528 | 0.591519847 | 0.590699431 | 0.14931569 |
| Monday, December 05, 2022 | | 91 | 0.2528 | 0.59063171 | 0.589812526 | 0.14909150 |
| Monday, March 06, 2023 | | 91 | 0.2528 | 0.58986987 | 0.589051743 | 0.14889919 |
| Monday, June 05, 2023 | | 91 | 0.2528 | 0.589232983 | 0.588415739 | 0.14873842 |
| Monday, September 04, 2023 | | 91 | 0.2528 | 0.588719767 | 0.587903235 | 0.14860887 |
| Monday, December 04, 2023 | | 91 | 0.2528 | 0.588329002 | 0.587513012 | 0.14851023 |
| Monday, March 04, 2024 | | 91 | 0.2528 | 0.588059527 | 0.587243911 | 0.14844221 |
| Monday, June 03, 2024 | | 91 | 0.2528 | 0.587910239 | 0.587094831 | 0.14840453 | | 0.587910239 | 0.58709483 | 0.14840453 |
| Monday, September 02, 2024 | | 91 | 0.2528 | 0.587880093 | 0.587064725 | 0.14839692 |
| Monday, December 02, 2024 | | 91 | 0.2528 | 0.587968099 | 0.587152609 | 0.14841913 |
| Monday, March 03, 2025 | | 91 | 0.2528 | 0.588173324 | 0.587357549 | 0.14847094 |

Figure 26

| | | | |
|---|---|---|---|
| Monday, June 02, 2025 | | 0.2528 | 0.588494889 | 0.587678669 | 0.14855211 |
| Monday, September 01, 2025 | 91 | 0.2528 | 0.588931969 | 0.588115142 | 0.14866244 |
| Monday, December 01, 2025 | 91 | 0.2528 | 0.58948379 | 0.588666198 | 0.14880173 |
| Monday, March 02, 2026 | 91 | 0.2528 | 0.590149633 | 0.589331118 | 0.14896981 |
| Monday, June 01, 2026 | 91 | 0.2528 | 0.590928828 | 0.590109232 | 0.14916650 |
| Monday, September 07, 2026 | 98 | 0.2722 | 0.591478234 | 0.590657876 | 0.16079020 |
| Monday, December 07, 2026 | 91 | 0.2528 | 0.592489403 | 0.591667643 | 0.14956043 |
| Monday, March 08, 2027 | 91 | 0.2528 | 0.593612098 | 0.59278878 | 0.14984383 |
| Monday, June 07, 2027 | 91 | 0.2528 | 0.59484585 | 0.594020821 | 0.15015526 |
| Monday, September 06, 2027 | 91 | 0.2528 | 0.596190239 | 0.595363346 | 0.15049462 |
| Monday, December 06, 2027 | 91 | 0.2528 | 0.597644893 | 0.596815982 | 0.15086182 |
| Monday, March 06, 2028 | 91 | 0.2528 | 0.599209484 | 0.598378403 | 0.15125676 |
| Monday, June 05, 2028 | 91 | 0.2528 | 0.600883735 | 0.600050332 | 0.15167939 |
| Monday, September 04, 2028 | 91 | 0.2528 | 0.60266741 | 0.601831533 | 0.15212964 |
| Monday, December 04, 2028 | 91 | 0.2528 | 0.604560323 | 0.60372182 | 0.15260746 |
| Monday, March 05, 2029 | 91 | 0.2528 | 0.606562329 | 0.60572105 | 0.15311282 |
| Monday, June 04, 2029 | 91 | 0.2528 | 0.608673331 | 0.607829123 | 0.15364570 |
| Monday, September 03, 2029 | 91 | 0.2528 | 0.600158486 | 0.599326088 | 0.15149632 |
| Monday, December 03, 2029 | 91 | 0.2528 | 0.591609254 | 0.590788714 | 0.14933826 |
| Monday, March 04, 2030 | 91 | 0.2528 | 0.583027796 | 0.582219158 | 0.14717207 |
| Monday, June 03, 2030 | 91 | 0.2528 | 0.574416268 | 0.573619574 | 0.14499828 |
| Monday, September 02, 2030 | 91 | 0.2528 | 0.56577682 | 0.564992109 | 0.14281745 |
| Monday, December 02, 2030 | 91 | 0.2528 | 0.557111597 | 0.556338904 | 0.14063011 |
| Monday, March 03, 2031 | 91 | 0.2528 | 0.548422734 | 0.547662093 | 0.13843681 |
| Monday, June 02, 2031 | 91 | 0.2528 | 0.539712362 | 0.538963802 | 0.13623807 |
| Monday, September 01, 2031 | 91 | 0.2528 | 0.530982601 | 0.530246148 | 0.13403444 |
| Monday, December 01, 2031 | 91 | 0.2528 | 0.522235561 | 0.52151124 | 0.13182645 |
| Monday, March 01, 2032 | 91 | 0.2528 | 0.513473344 | 0.512761175 | 0.12961463 |
| Monday, June 07, 2032 | 98 | 0.2722 | 0.504413665 | 0.503714062 | 0.13712216 |
| Monday, September 06, 2032 | 91 | 0.2528 | 0.495626557 | 0.494939142 | 0.12510962 |
| Monday, December 06, 2032 | 91 | 0.2528 | 0.486830555 | 0.48615534 | 0.12288927 |

Figure 27

| | | | | |
|---|---|---|---|---|
| Monday, March 07, 2033 | 91 | 0.2528 | 0.478027713 | 0.477364706 | 0.12066719 |
| Monday, June 06, 2033 | 91 | 0.2528 | 0.469220069 | 0.468569279 | 0.11844390 |
| Monday, September 05, 2033 | 91 | 0.2528 | 0.46040965 | 0.459771079 | 0.11621991 |
| Monday, December 05, 2033 | 91 | 0.2528 | 0.451598464 | 0.450972114 | 0.11399573 |
| Monday, March 06, 2034 | 91 | 0.2528 | 0.442788508 | 0.442174377 | 0.11177186 |
| Monday, June 05, 2034 | 91 | 0.2528 | 0.43398176 | 0.433379844 | 0.10954879 |
| Monday, September 04, 2034 | 91 | 0.2528 | 0.425180182 | 0.424590473 | 0.10732704 |
| Monday, December 04, 2034 | 91 | 0.2528 | 0.416385718 | 0.415808207 | 0.10510707 |
| Monday, March 05, 2035 | 91 | 0.2528 | 0.407600295 | 0.407034968 | 0.10288939 |
| Monday, June 04, 2035 | 91 | 0.2528 | 0.398982582 | 0.398272663 | 0.10067448 |
| Monday, September 03, 2035 | 91 | 0.2528 | 0.390064182 | 0.389523178 | 0.09846280 |
| Monday, December 03, 2035 | 91 | 0.2528 | 0.381317251 | 0.380788378 | 0.09625484 |
| Monday, March 03, 2036 | 91 | 0.2528 | 0.350446423 | 0.349960367 | 0.08846220 |
| Monday, June 02, 2036 | 91 | 0.2528 | 0.319593782 | 0.319150517 | 0.08067416 |
| Monday, September 01, 2036 | 91 | 0.2528 | 0.288793915 | 0.288393368 | 0.07289943 |
| Monday, December 01, 2036 | 91 | 0.2528 | 0.258080992 | 0.257723043 | 0.06514666 |
| Monday, March 02, 2037 | 91 | 0.2528 | 0.227488701 | 0.227173183 | 0.05742433 |
| Monday, June 01, 2037 | 91 | 0.2528 | 0.197050193 | 0.196776891 | 0.04974083 |

MTM on Jun-10 Swap using SVF method

| June 13th Fixed Rate | Notional | Swap Value Factor | June 13th Fixed NPV | MTM, 6/13 relative to 6/4 |
|---|---|---|---|---|
| 4.2408% | $1,000,000,000.00 | 18.9076623740 | $801,836,145.96 | $276,051,870.66 |

Figure 28

Fixed NPV as of 6/13/07 (discounted to June 07 IMM date)

| Coupon Date | Fixed Rate | Notional | Daycount Fraction | IMM Discount Factor | PV(Coupon) |
|---|---|---|---|---|---|
| Monday, September 17, 2007 | 4.2408% | $1,000,000,000,000.00 | 0.2528 | 0.986630261 | $10,576,479.07 |
| Monday, December 17, 2007 | 4.2408% | $1,000,000,000,000.00 | 0.2528 | 0.973537044 | $10,436,122.41 |
| Monday, March 17, 2008 | 4.2408% | $1,000,000,000,000.00 | 0.2528 | 0.960714721 | $10,298,669.67 |
| Monday, June 16, 2008 | 4.2408% | $1,000,000,000,000.00 | 0.2722 | 0.948157790 | $10,164,061.87 |
| Monday, September 22, 2008 | 4.2408% | $1,000,000,000,000.00 | 0.2722 | 0.934913531 | $10,793,015.77 |
| Monday, December 22, 2008 | 4.2408% | $1,000,000,000,000.00 | 0.2528 | 0.922887355 | $9,893,167.86 |
| Monday, March 16, 2009 | 4.2408% | $1,000,000,000,000.00 | 0.2333 | 0.912027752 | $9,024,697.01 |
| Monday, June 22, 2009 | 4.2408% | $1,000,000,000,000.00 | 0.2722 | 0.899578503 | $10,385,094.07 |
| Monday, September 14, 2009 | 4.2408% | $1,000,000,000,000.00 | 0.2333 | 0.889172910 | $8,798,543.78 |
| Monday, December 21, 2009 | 4.2408% | $1,000,000,000,000.00 | 0.2722 | 0.877227312 | $10,127,062.98 |
| Monday, March 22, 2010 | 4.2408% | $1,000,000,000,000.00 | 0.2528 | 0.866398785 | $9,287,621.69 |
| Monday, June 21, 2010 | 4.2408% | $1,000,000,000,000.00 | 0.2528 | 0.855795645 | $9,173,958.16 |
| Monday, September 20, 2010 | 4.2408% | $1,000,000,000,000.00 | 0.2528 | 0.845413426 | $9,062,662.85 |
| Monday, December 20, 2010 | 4.2408% | $1,000,000,000,000.00 | 0.2528 | 0.835247761 | $8,953,688.95 |
| Monday, March 21, 2011 | 4.2408% | $1,000,000,000,000.00 | 0.2528 | 0.825294381 | $8,846,990.71 |
| Monday, June 20, 2011 | 4.2408% | $1,000,000,000,000.00 | 0.2528 | 0.815549115 | $8,742,523.40 |
| Monday, September 19, 2011 | 4.2408% | $1,000,000,000,000.00 | 0.2528 | 0.806007884 | $8,640,243.31 |
| Monday, December 19, 2011 | 4.2408% | $1,000,000,000,000.00 | 0.2528 | 0.796666703 | $8,540,107.72 |
| Monday, March 19, 2012 | 4.2408% | $1,000,000,000,000.00 | 0.2528 | 0.787521675 | $8,442,074.85 |
| Monday, June 18, 2012 | 4.2408% | $1,000,000,000,000.00 | 0.2528 | 0.778568992 | $8,346,103.88 |
| Monday, September 17, 2012 | 4.2408% | $1,000,000,000,000.00 | 0.2528 | 0.769980493 | $8,252,154.89 |
| Monday, December 17, 2012 | 4.2408% | $1,000,000,000,000.00 | 0.2528 | 0.761225851 | $8,160,188.88 |
| Monday, March 18, 2013 | 4.2408% | $1,000,000,000,000.00 | 0.2528 | 0.752828196 | $8,070,167.69 |
| Monday, June 17, 2013 | 4.2408% | $1,000,000,000,000.00 | 0.2528 | 0.744608487 | $7,982,054.05 |
| Monday, September 16, 2013 | 4.2408% | $1,000,000,000,000.00 | 0.2528 | 0.736563323 | $7,895,811.51 |
| Monday, December 16, 2013 | 4.2408% | $1,000,000,000,000.00 | 0.2528 | 0.728689382 | $7,811,404.44 |
| Monday, March 17, 2014 | 4.2408% | $1,000,000,000,000.00 | 0.2528 | 0.720983414 | $7,728,798.00 |
| Monday, June 16, 2014 | 4.2408% | $1,000,000,000,000.00 | 0.2528 | 0.713442241 | $7,647,958.13 |
| Monday, September 15, 2014 | 4.2408% | $1,000,000,000,000.00 | 0.2528 | 0.706062757 | $7,568,851.54 |
| Monday, December 15, 2014 | 4.2408% | $1,000,000,000,000.00 | 0.2528 | 0.698841926 | $7,491,445.68 |
| Monday, March 16, 2015 | 4.2408% | $1,000,000,000,000.00 | 0.2528 | 0.691777678 | $7,415,708.73 |
| Monday, June 15, 2015 | 4.2408% | $1,000,000,000,000.00 | 0.2528 | 0.684864416 | $7,341,609.57 |
| Monday, September 14, 2015 | 4.2408% | $1,000,000,000,000.00 | 0.2528 | 0.678101996 | $7,269,117.78 |
| Monday, December 14, 2015 | 4.2408% | $1,000,000,000,000.00 | 0.2528 | 0.671486746 | $7,198,203.62 |

Figure 29

| | | | | |
|---|---|---|---|---|
| Monday, March 14, 2016 | 4.2408% | $1,000,000,000.00 | 0.2528 | 0.665015954 | $7,128,838.02 |
| Monday, June 13, 2016 | 4.2408% | $1,000,000,000.00 | 0.2528 | 0.660134595 | $7,076,510.84 |
| Monday, September 12, 2016 | 4.2408% | $1,000,000,000.00 | 0.2528 | 0.655441313 | $7,026,199.79 |
| Monday, December 12, 2016 | 4.2408% | $1,000,000,000.00 | 0.2528 | 0.650932556 | $6,977,866.81 |
| Monday, March 13, 2017 | 4.2408% | $1,000,000,000.00 | 0.2528 | 0.646604886 | $6,931,475.06 |
| Monday, June 12, 2017 | 4.2408% | $1,000,000,000.00 | 0.2528 | 0.642454978 | $6,886,988.88 |
| Monday, September 11, 2017 | 4.2408% | $1,000,000,000.00 | 0.2528 | 0.638479614 | $6,844,373.76 |
| Monday, December 11, 2017 | 4.2408% | $1,000,000,000.00 | 0.2528 | 0.63467568 | $6,803,596.36 |
| Monday, March 12, 2018 | 4.2408% | $1,000,000,000.00 | 0.2528 | 0.631040167 | $6,764,624.38 |
| Monday, June 11, 2018 | 4.2408% | $1,000,000,000.00 | 0.2528 | 0.627570163 | $6,727,426.63 |
| Monday, September 10, 2018 | 4.2408% | $1,000,000,000.00 | 0.2528 | 0.624262856 | $6,691,972.96 |
| Monday, December 10, 2018 | 4.2408% | $1,000,000,000.00 | 0.2528 | 0.621115528 | $6,658,234.23 |
| Monday, March 11, 2019 | 4.2408% | $1,000,000,000.00 | 0.2528 | 0.618125552 | $6,626,182.30 |
| Monday, June 10, 2019 | 4.2408% | $1,000,000,000.00 | 0.2528 | 0.615290395 | $6,595,789.97 |
| Monday, September 09, 2019 | 4.2408% | $1,000,000,000.00 | 0.2528 | 0.612607607 | $6,567,031.03 |
| Monday, December 09, 2019 | 4.2408% | $1,000,000,000.00 | 0.2528 | 0.61007483 | $6,539,880.16 |
| Monday, March 09, 2020 | 4.2408% | $1,000,000,000.00 | 0.2528 | 0.607689784 | $6,514,312.95 |
| Monday, June 08, 2020 | 4.2408% | $1,000,000,000.00 | 0.2528 | 0.605450275 | $6,490,305.86 |
| Monday, September 07, 2020 | 4.2408% | $1,000,000,000.00 | 0.2528 | 0.603354188 | $6,467,836.23 |
| Monday, December 07, 2020 | 4.2408% | $1,000,000,000.00 | 0.2528 | 0.601399485 | $6,446,882.20 |
| Monday, March 08, 2021 | 4.2408% | $1,000,000,000.00 | 0.2528 | 0.599584206 | $6,427,422.78 |
| Monday, June 07, 2021 | 4.2408% | $1,000,000,000.00 | 0.2528 | 0.597906466 | $6,409,437.73 |
| Monday, September 06, 2021 | 4.2408% | $1,000,000,000.00 | 0.2528 | 0.59636445 | $6,392,907.63 |
| Monday, December 06, 2021 | 4.2408% | $1,000,000,000.00 | 0.2528 | 0.594956417 | $6,377,813.80 |
| Monday, March 07, 2022 | 4.2408% | $1,000,000,000.00 | 0.2528 | 0.593680697 | $6,364,138.33 |
| Monday, June 06, 2022 | 4.2408% | $1,000,000,000.00 | 0.2528 | 0.592535685 | $6,351,864.04 |
| Monday, September 05, 2022 | 4.2408% | $1,000,000,000.00 | 0.2528 | 0.591519847 | $6,340,974.45 |
| Monday, December 05, 2022 | 4.2408% | $1,000,000,000.00 | 0.2528 | 0.59063171 | $6,331,453.81 |
| Monday, March 06, 2023 | 4.2408% | $1,000,000,000.00 | 0.2528 | 0.58986987 | $6,323,287.03 |
| Monday, June 05, 2023 | 4.2408% | $1,000,000,000.00 | 0.2528 | 0.589232983 | $6,316,459.73 |
| Monday, September 04, 2023 | 4.2408% | $1,000,000,000.00 | 0.2528 | 0.588719767 | $6,310,958.16 |
| Monday, December 04, 2023 | 4.2408% | $1,000,000,000.00 | 0.2528 | 0.588329002 | $6,306,769.24 |
| Monday, March 04, 2024 | 4.2408% | $1,000,000,000.00 | 0.2528 | 0.588059527 | $6,303,880.52 |
| Monday, June 03, 2024 | 4.2408% | $1,000,000,000.00 | 0.2528 | 0.587910239 | $6,302,280.18 |
| Monday, September 02, 2024 | 4.2408% | $1,000,000,000.00 | 0.2528 | 0.587880093 | $6,301,957.02 |
| Monday, December 02, 2024 | 4.2408% | $1,000,000,000.00 | 0.2528 | 0.587968099 | $6,302,900.43 |
| Monday, March 03, 2025 | 4.2408% | $1,000,000,000.00 | 0.2528 | 0.588173324 | $6,305,100.40 |
| Monday, June 02, 2025 | 4.2408% | $1,000,000,000.00 | 0.2528 | 0.588494889 | $6,308,547.51 |

Figure 30

| | | | | |
|---|---|---|---|---|
| Monday, September 01, 2025 | 4.2408% | $1,000,000,000,000.00 | 0.2528 | 0.588931969 | $6,313,232.92 |
| Monday, December 01, 2025 | 4.2408% | $1,000,000,000,000.00 | 0.2528 | 0.58948379 | $6,319,148.33 |
| Monday, March 02, 2026 | 4.2408% | $1,000,000,000,000.00 | 0.2528 | 0.590149633 | $6,326,286.04 |
| Monday, June 01, 2026 | 4.2408% | $1,000,000,000,000.00 | 0.2528 | 0.590928828 | $6,334,638.85 |
| Monday, September 07, 2026 | 4.2408% | $1,000,000,000,000.00 | 0.2722 | 0.591478234 | $6,828,261.32 |
| Monday, December 07, 2026 | 4.2408% | $1,000,000,000,000.00 | 0.2528 | 0.592489403 | $6,351,367.90 |
| Monday, March 08, 2027 | 4.2408% | $1,000,000,000,000.00 | 0.2528 | 0.593612098 | $6,363,402.97 |
| Monday, June 07, 2027 | 4.2408% | $1,000,000,000,000.00 | 0.2528 | 0.59484585 | $6,376,628.54 |
| Monday, September 06, 2027 | 4.2408% | $1,000,000,000,000.00 | 0.2528 | 0.596190239 | $6,391,040.13 |
| Monday, December 06, 2027 | 4.2408% | $1,000,000,000,000.00 | 0.2528 | 0.597644893 | $6,406,633.72 |
| Monday, March 06, 2028 | 4.2408% | $1,000,000,000,000.00 | 0.2528 | 0.599209484 | $6,423,405.83 |
| Monday, June 05, 2028 | 4.2408% | $1,000,000,000,000.00 | 0.2528 | 0.600883735 | $6,441,353.46 |
| Monday, September 04, 2028 | 4.2408% | $1,000,000,000,000.00 | 0.2528 | 0.60266741 | $6,460,474.10 |
| Monday, December 04, 2028 | 4.2408% | $1,000,000,000,000.00 | 0.2528 | 0.604560323 | $6,480,765.75 |
| Monday, March 05, 2029 | 4.2408% | $1,000,000,000,000.00 | 0.2528 | 0.606562329 | $6,502,226.85 |
| Monday, June 04, 2029 | 4.2408% | $1,000,000,000,000.00 | 0.2528 | 0.608673331 | $6,524,856.37 |
| Monday, September 03, 2029 | 4.2408% | $1,000,000,000,000.00 | 0.2528 | 0.600158486 | $6,433,578.94 |
| Monday, December 03, 2029 | 4.2408% | $1,000,000,000,000.00 | 0.2528 | 0.591609254 | $6,341,932.88 |
| Monday, March 04, 2030 | 4.2408% | $1,000,000,000,000.00 | 0.2528 | 0.583027796 | $6,249,941.37 |
| Monday, June 03, 2030 | 4.2408% | $1,000,000,000,000.00 | 0.2528 | 0.574416268 | $6,157,627.51 |
| Monday, September 02, 2030 | 4.2408% | $1,000,000,000,000.00 | 0.2528 | 0.56577682 | $6,065,014.36 |
| Monday, December 02, 2030 | 4.2408% | $1,000,000,000,000.00 | 0.2528 | 0.557111597 | $5,972,124.89 |
| Monday, March 03, 2031 | 4.2408% | $1,000,000,000,000.00 | 0.2528 | 0.548422734 | $5,878,982.03 |
| Monday, June 02, 2031 | 4.2408% | $1,000,000,000,000.00 | 0.2528 | 0.539712362 | $5,785,608.58 |
| Monday, September 01, 2031 | 4.2408% | $1,000,000,000,000.00 | 0.2528 | 0.530982601 | $5,692,027.29 |
| Monday, December 01, 2031 | 4.2408% | $1,000,000,000,000.00 | 0.2528 | 0.522235561 | $5,598,260.77 |
| Monday, March 01, 2032 | 4.2408% | $1,000,000,000,000.00 | 0.2528 | 0.513473344 | $5,504,331.55 |
| Monday, June 07, 2032 | 4.2408% | $1,000,000,000,000.00 | 0.2722 | 0.504413665 | $5,823,153.11 |
| Monday, September 06, 2032 | 4.2408% | $1,000,000,000,000.00 | 0.2528 | 0.495626557 | $5,313,017.57 |
| Monday, December 06, 2032 | 4.2408% | $1,000,000,000,000.00 | 0.2528 | 0.486830555 | $5,218,726.19 |
| Monday, March 07, 2033 | 4.2408% | $1,000,000,000,000.00 | 0.2528 | 0.478027713 | $5,124,361.48 |
| Monday, June 06, 2033 | 4.2408% | $1,000,000,000,000.00 | 0.2528 | 0.469220069 | $5,029,945.30 |

Figure 31

| | | | | |
|---|---|---|---|---|
| Monday, September 05, 2033 | 4.2408% | $1,000,000,000,000.00 | 0.2528 | 0.46040965 | $4,935,499.36 |
| Monday, December 05, 2033 | 4.2408% | $1,000,000,000,000.00 | 0.2528 | 0.451598464 | $4,841,045.22 |
| Monday, March 06, 2034 | 4.2408% | $1,000,000,000,000.00 | 0.2528 | 0.442788508 | $4,746,604.25 |
| Monday, June 05, 2034 | 4.2408% | $1,000,000,000,000.00 | 0.2528 | 0.43398176 | $4,652,197.68 |
| Monday, September 04, 2034 | 4.2408% | $1,000,000,000,000.00 | 0.2528 | 0.425180182 | $4,557,846.52 |
| Monday, December 04, 2034 | 4.2408% | $1,000,000,000,000.00 | 0.2528 | 0.416385718 | $4,463,571.62 |
| Monday, March 05, 2035 | 4.2408% | $1,000,000,000,000.00 | 0.2528 | 0.407600295 | $4,369,393.64 |
| Monday, June 04, 2035 | 4.2408% | $1,000,000,000,000.00 | 0.2528 | 0.39882582 | $4,275,333.02 |
| Monday, September 03, 2035 | 4.2408% | $1,000,000,000,000.00 | 0.2528 | 0.390064182 | $4,181,410.02 |
| Monday, December 03, 2035 | 4.2408% | $1,000,000,000,000.00 | 0.2528 | 0.381317251 | $4,087,644.66 |
| Monday, March 03, 2036 | 4.2408% | $1,000,000,000,000.00 | 0.2528 | 0.350446423 | $3,756,715.57 |
| Monday, June 02, 2036 | 4.2408% | $1,000,000,000,000.00 | 0.2528 | 0.319593782 | $3,425,981.42 |
| Monday, September 01, 2036 | 4.2408% | $1,000,000,000,000.00 | 0.2528 | 0.288793915 | $3,095,813.01 |
| Monday, December 01, 2036 | 4.2408% | $1,000,000,000,000.00 | 0.2528 | 0.258080992 | $2,766,576.62 |
| Monday, March 02, 2037 | 4.2408% | $1,000,000,000,000.00 | 0.2528 | 0.227488701 | $2,438,633.38 |
| Monday, June 01, 2037 | 4.2408% | $1,000,000,000,000.00 | 0.2528 | 0.197050193 | $2,112,338.66 |

Fixed NPV discounted to 6/18  $802,949,807.27

Figure 32

Fixed NPV as of 6/12/07 (discounted to June 07 IMM date)

| Coupon Date | Fixed Rate | Notional | Daycount Fraction | IMM Discount Factor | PV(Coupon) |
|---|---|---|---|---|---|
| Monday, September 17, 2007 | 2.7808% | $1,000,000,000.00 | 0.2528 | 0.986630261 | $6,935,265.28 |
| Monday, December 17, 2007 | 2.7808% | $1,000,000,000.00 | 0.2528 | 0.973537044 | $6,843,229.86 |
| Monday, March 17, 2008 | 2.7808% | $1,000,000,000.00 | 0.2528 | 0.960714721 | $6,753,098.61 |
| Monday, June 16, 2008 | 2.7808% | $1,000,000,000.00 | 0.2528 | 0.94815779 | $6,664,832.88 |
| Monday, September 22, 2008 | 2.7808% | $1,000,000,000.00 | 0.2722 | 0.934913531 | $7,077,253.88 |
| Monday, December 22, 2008 | 2.7808% | $1,000,000,000.00 | 0.2528 | 0.922887355 | $6,487,200.81 |
| Monday, March 16, 2009 | 2.7808% | $1,000,000,000.00 | 0.2333 | 0.912027752 | $5,917,722.47 |
| Monday, June 22, 2009 | 2.7808% | $1,000,000,000.00 | 0.2722 | 0.899578503 | $6,809,769.29 |
| Monday, September 14, 2009 | 2.7808% | $1,000,000,000.00 | 0.2333 | 0.88917291 | $5,769,428.06 |
| Monday, December 21, 2009 | 2.7808% | $1,000,000,000.00 | 0.2722 | 0.877227312 | $6,640,571.77 |
| Monday, March 22, 2010 | 2.7808% | $1,000,000,000.00 | 0.2528 | 0.866398785 | $6,090,128.84 |
| Monday, June 21, 2010 | 2.7808% | $1,000,000,000.00 | 0.2528 | 0.855795645 | $6,015,596.78 |
| Monday, September 20, 2010 | 2.7808% | $1,000,000,000.00 | 0.2528 | 0.845413426 | $5,942,617.63 |
| Monday, December 20, 2010 | 2.7808% | $1,000,000,000.00 | 0.2528 | 0.835247761 | $5,871,160.68 |
| Monday, March 21, 2011 | 2.7808% | $1,000,000,000.00 | 0.2528 | 0.825294381 | $5,801,195.94 |
| Monday, June 20, 2011 | 2.7808% | $1,000,000,000.00 | 0.2528 | 0.815549115 | $5,732,694.08 |
| Monday, September 19, 2011 | 2.7808% | $1,000,000,000.00 | 0.2528 | 0.806007884 | $5,665,626.44 |
| Monday, December 19, 2011 | 2.7808% | $1,000,000,000.00 | 0.2528 | 0.796666703 | $5,599,965.00 |
| Monday, March 19, 2012 | 2.7808% | $1,000,000,000.00 | 0.2528 | 0.787521675 | $5,535,682.36 |
| Monday, June 18, 2012 | 2.7808% | $1,000,000,000.00 | 0.2528 | 0.778568992 | $5,472,751.76 |
| Monday, September 17, 2012 | 2.7808% | $1,000,000,000.00 | 0.2528 | 0.769980493 | $5,411,147.03 |
| Monday, December 17, 2012 | 2.7808% | $1,000,000,000.00 | 0.2528 | 0.761225851 | $5,350,842.58 |
| Monday, March 18, 2013 | 2.7808% | $1,000,000,000.00 | 0.2528 | 0.752828196 | $5,291,813.41 |
| Monday, June 17, 2013 | 2.7808% | $1,000,000,000.00 | 0.2528 | 0.744608487 | $5,234,035.07 |
| Monday, September 16, 2013 | 2.7808% | $1,000,000,000.00 | 0.2528 | 0.736563323 | $5,177,483.65 |
| Monday, December 16, 2013 | 2.7808% | $1,000,000,000.00 | 0.2528 | 0.728689382 | $5,122,135.79 |
| Monday, March 17, 2014 | 2.7808% | $1,000,000,000.00 | 0.2528 | 0.720983414 | $5,067,968.66 |

Figure 33

| | | | | |
|---|---|---|---|---|
| Monday, June 16, 2014 | 2.7808% | $1,000,000,000.00 | 0.2528 | 0.713442241 | $5,014,959.91 |
| Monday, September 15, 2014 | 2.7808% | $1,000,000,000.00 | 0.2528 | 0.706062757 | $4,963,087.71 |
| Monday, December 15, 2014 | 2.7808% | $1,000,000,000.00 | 0.2528 | 0.698841926 | $4,912,330.73 |
| Monday, March 16, 2015 | 2.7808% | $1,000,000,000.00 | 0.2528 | 0.69177678 | $4,862,668.09 |
| Monday, June 15, 2015 | 2.7808% | $1,000,000,000.00 | 0.2528 | 0.684864416 | $4,814,079.39 |
| Monday, September 14, 2015 | 2.7808% | $1,000,000,000.00 | 0.2528 | 0.678101996 | $4,766,544.69 |
| Monday, December 14, 2015 | 2.7808% | $1,000,000,000.00 | 0.2528 | 0.671486746 | $4,720,044.48 |
| Monday, March 14, 2016 | 2.7808% | $1,000,000,000.00 | 0.2528 | 0.665015954 | $4,674,559.70 |
| Monday, June 13, 2016 | 2.7808% | $1,000,000,000.00 | 0.2528 | 0.660134595 | $4,640,247.44 |
| Monday, September 12, 2016 | 2.7808% | $1,000,000,000.00 | 0.2528 | 0.655441313 | $4,607,257.21 |
| Monday, December 12, 2016 | 2.7808% | $1,000,000,000.00 | 0.2528 | 0.650932556 | $4,575,564.05 |
| Monday, March 13, 2017 | 2.7808% | $1,000,000,000.00 | 0.2528 | 0.646604886 | $4,545,143.80 |
| Monday, June 12, 2017 | 2.7808% | $1,000,000,000.00 | 0.2528 | 0.642454978 | $4,515,973.09 |
| Monday, September 11, 2017 | 2.7808% | $1,000,000,000.00 | 0.2528 | 0.638479614 | $4,488,029.28 |
| Monday, December 11, 2017 | 2.7808% | $1,000,000,000.00 | 0.2528 | 0.63467568 | $4,461,290.50 |
| Monday, March 12, 2018 | 2.7808% | $1,000,000,000.00 | 0.2528 | 0.631040167 | $4,435,735.59 |
| Monday, June 11, 2018 | 2.7808% | $1,000,000,000.00 | 0.2528 | 0.627570163 | $4,411,344.08 |
| Monday, September 10, 2018 | 2.7808% | $1,000,000,000.00 | 0.2528 | 0.624262856 | $4,388,096.21 |
| Monday, December 10, 2018 | 2.7808% | $1,000,000,000.00 | 0.2528 | 0.621115528 | $4,365,972.87 |
| Monday, March 11, 2019 | 2.7808% | $1,000,000,000.00 | 0.2528 | 0.618125552 | $4,344,955.60 |
| Monday, June 10, 2019 | 2.7808% | $1,000,000,000.00 | 0.2528 | 0.615290395 | $4,325,026.59 |
| Monday, September 09, 2019 | 2.7808% | $1,000,000,000.00 | 0.2528 | 0.612607607 | $4,306,168.62 |
| Monday, December 09, 2019 | 2.7808% | $1,000,000,000.00 | 0.2528 | 0.61007483 | $4,288,365.11 |
| Monday, March 09, 2020 | 2.7808% | $1,000,000,000.00 | 0.2528 | 0.607689784 | $4,271,600.04 |
| Monday, June 08, 2020 | 2.7808% | $1,000,000,000.00 | 0.2528 | 0.605450275 | $4,255,857.98 |
| Monday, September 07, 2020 | 2.7808% | $1,000,000,000.00 | 0.2528 | 0.603354188 | $4,241,124.07 |
| Monday, December 07, 2020 | 2.7808% | $1,000,000,000.00 | 0.2528 | 0.601399485 | $4,227,383.99 |
| Monday, March 08, 2021 | 2.7808% | $1,000,000,000.00 | 0.2528 | 0.599584206 | $4,214,623.95 |
| Monday, June 07, 2021 | 2.7808% | $1,000,000,000.00 | 0.2528 | 0.597906466 | $4,202,830.70 |
| Monday, September 06, 2021 | 2.7808% | $1,000,000,000.00 | 0.2528 | 0.59636445 | $4,191,991.49 |

Figure 34

| | | | | |
|---|---|---|---|---|
| Monday, December 06, 2021 | 2.7808% | $1,000,000,000.00 | 0.2528 | 0.594956417 | $4,182,094.09 |
| Monday, March 07, 2022 | 2.7808% | $1,000,000,000.00 | 0.2528 | 0.593680697 | $4,173,126.74 |
| Monday, June 06, 2022 | 2.7808% | $1,000,000,000.00 | 0.2528 | 0.592535685 | $4,165,078.17 |
| Monday, September 05, 2022 | 2.7808% | $1,000,000,000.00 | 0.2528 | 0.591519847 | $4,157,937.60 |
| Monday, December 05, 2022 | 2.7808% | $1,000,000,000.00 | 0.2528 | 0.59063171 | $4,151,694.67 |
| Monday, March 06, 2023 | 2.7808% | $1,000,000,000.00 | 0.2528 | 0.58986987 | $4,146,339.51 |
| Monday, June 05, 2023 | 2.7808% | $1,000,000,000.00 | 0.2528 | 0.589232983 | $4,141,862.67 |
| Monday, September 04, 2023 | 2.7808% | $1,000,000,000.00 | 0.2528 | 0.588719767 | $4,138,255.15 |
| Monday, December 04, 2023 | 2.7808% | $1,000,000,000.00 | 0.2528 | 0.588329002 | $4,135,508.37 |
| Monday, March 04, 2024 | 2.7808% | $1,000,000,000.00 | 0.2528 | 0.588059527 | $4,133,614.17 |
| Monday, June 03, 2024 | 2.7808% | $1,000,000,000.00 | 0.2528 | 0.587910239 | $4,132,564.78 |
| Monday, September 02, 2024 | 2.7808% | $1,000,000,000.00 | 0.2528 | 0.587880093 | $4,132,352.88 |
| Monday, December 02, 2024 | 2.7808% | $1,000,000,000.00 | 0.2528 | 0.587968099 | $4,132,971.49 |
| Monday, March 03, 2025 | 2.7808% | $1,000,000,000.00 | 0.2528 | 0.588173324 | $4,134,414.07 |
| Monday, June 02, 2025 | 2.7808% | $1,000,000,000.00 | 0.2528 | 0.588494889 | $4,136,674.43 |
| Monday, September 01, 2025 | 2.7808% | $1,000,000,000.00 | 0.2528 | 0.588931969 | $4,139,746.77 |
| Monday, December 01, 2025 | 2.7808% | $1,000,000,000.00 | 0.2528 | 0.58948379 | $4,143,625.66 |
| Monday, March 02, 2026 | 2.7808% | $1,000,000,000.00 | 0.2528 | 0.590149633 | $4,148,306.03 |
| Monday, June 01, 2026 | 2.7808% | $1,000,000,000.00 | 0.2528 | 0.590928828 | $4,153,783.18 |
| Monday, September 07, 2026 | 2.7808% | $1,000,000,000.00 | 0.2722 | 0.591478234 | $4,477,463.94 |
| Monday, December 07, 2026 | 2.7808% | $1,000,000,000.00 | 0.2528 | 0.592489403 | $4,164,752.85 |
| Monday, March 08, 2027 | 2.7808% | $1,000,000,000.00 | 0.2528 | 0.593612098 | $4,172,644.54 |
| Monday, June 07, 2027 | 2.7808% | $1,000,000,000.00 | 0.2528 | 0.59484585 | $4,181,316.89 |
| Monday, September 06, 2027 | 2.7808% | $1,000,000,000.00 | 0.2528 | 0.596190239 | $4,190,766.93 |
| Monday, December 06, 2027 | 2.7808% | $1,000,000,000.00 | 0.2528 | 0.597644893 | $4,200,992.04 |
| Monday, March 06, 2028 | 2.7808% | $1,000,000,000.00 | 0.2528 | 0.599209484 | $4,211,989.94 |
| Monday, June 05, 2028 | 2.7808% | $1,000,000,000.00 | 0.2528 | 0.600883735 | $4,223,758.65 |
| Monday, September 04, 2028 | 2.7808% | $1,000,000,000.00 | 0.2528 | 0.60266741 | $4,236,296.55 |
| Monday, December 04, 2028 | 2.7808% | $1,000,000,000.00 | 0.2528 | 0.604560323 | $4,249,602.29 |
| Monday, March 05, 2029 | 2.7808% | $1,000,000,000.00 | 0.2528 | 0.606562329 | $4,263,674.88 |

Figure 35

| Date | Rate | Notional | Discount Factor | Value |
|---|---|---|---|---|
| Monday, June 04, 2029 | 2.7808% | $1,000,000,000.00 | 0.2528 | 0.608673331 | $4,278,513.63 |
| Monday, September 03, 2029 | 2.7808% | $1,000,000,000.00 | 0.2528 | 0.600158466 | $4,218,660.70 |
| Monday, December 03, 2029 | 2.7808% | $1,000,000,000.00 | 0.2528 | 0.591609254 | $4,158,566.06 |
| Monday, March 04, 2030 | 2.7808% | $1,000,000,000.00 | 0.2528 | 0.583027796 | $4,098,244.90 |
| Monday, June 03, 2030 | 2.7808% | $1,000,000,000.00 | 0.2528 | 0.574416268 | $4,037,712.36 |
| Monday, September 02, 2030 | 2.7808% | $1,000,000,000.00 | 0.2528 | 0.565777682 | $3,976,983.57 |
| Monday, December 02, 2030 | 2.7808% | $1,000,000,000.00 | 0.2528 | 0.557111597 | $3,916,073.60 |
| Monday, March 03, 2031 | 2.7808% | $1,000,000,000.00 | 0.2528 | 0.548422734 | $3,854,997.46 |
| Monday, June 02, 2031 | 2.7808% | $1,000,000,000.00 | 0.2528 | 0.539712362 | $3,793,770.12 |
| Monday, September 01, 2031 | 2.7808% | $1,000,000,000.00 | 0.2528 | 0.530982601 | $3,732,406.50 |
| Monday, December 01, 2031 | 2.7808% | $1,000,000,000.00 | 0.2528 | 0.522235561 | $3,670,921.42 |
| Monday, March 01, 2032 | 2.7808% | $1,000,000,000.00 | 0.2528 | 0.513473344 | $3,609,329.65 |
| Monday, June 07, 2032 | 2.7808% | $1,000,000,000.00 | 0.2722 | 0.504413665 | $3,818,389.02 |
| Monday, September 06, 2032 | 2.7808% | $1,000,000,000.00 | 0.2528 | 0.495626557 | $3,483,880.22 |
| Monday, December 06, 2032 | 2.7808% | $1,000,000,000.00 | 0.2528 | 0.486830555 | $3,422,050.98 |
| Monday, March 07, 2033 | 2.7808% | $1,000,000,000.00 | 0.2528 | 0.478027713 | $3,360,173.65 |
| Monday, June 06, 2033 | 2.7808% | $1,000,000,000.00 | 0.2528 | 0.469220069 | $3,298,262.56 |
| Monday, September 05, 2033 | 2.7808% | $1,000,000,000.00 | 0.2528 | 0.460409965 | $3,236,331.97 |
| Monday, December 05, 2033 | 2.7808% | $1,000,000,000.00 | 0.2528 | 0.451598464 | $3,174,396.00 |
| Monday, March 06, 2034 | 2.7808% | $1,000,000,000.00 | 0.2528 | 0.442788508 | $3,112,468.66 |
| Monday, June 05, 2034 | 2.7808% | $1,000,000,000.00 | 0.2528 | 0.433981760 | $3,050,563.88 |
| Monday, September 04, 2034 | 2.7808% | $1,000,000,000.00 | 0.2528 | 0.425180182 | $2,988,695.43 |
| Monday, December 04, 2034 | 2.7808% | $1,000,000,000.00 | 0.2528 | 0.416385718 | $2,926,877.00 |
| Monday, March 05, 2035 | 2.7808% | $1,000,000,000.00 | 0.2528 | 0.407600295 | $2,865,122.11 |
| Monday, June 04, 2035 | 2.7808% | $1,000,000,000.00 | 0.2528 | 0.398825820 | $2,803,444.18 |
| Monday, September 03, 2035 | 2.7808% | $1,000,000,000.00 | 0.2528 | 0.390064182 | $2,741,856.48 |
| Monday, December 03, 2035 | 2.7808% | $1,000,000,000.00 | 0.2528 | 0.381317251 | $2,680,372.17 |
| Monday, March 03, 2036 | 2.7808% | $1,000,000,000.00 | 0.2528 | 0.350446423 | $2,463,373.57 |
| Monday, June 02, 2036 | 2.7808% | $1,000,000,000.00 | 0.2528 | 0.319593782 | $2,246,502.81 |
| Monday, September 01, 2036 | 2.7808% | $1,000,000,000.00 | 0.2528 | 0.288793915 | $2,030,003.02 |
| Monday, December 01, 2036 | 2.7808% | $1,000,000,000.00 | 0.2528 | 0.258080992 | $1,814,114.38 |
| Monday, March 02, 2037 | 2.7808% | $1,000,000,000.00 | 0.2528 | 0.227488701 | $1,599,073.69 |
| Monday, June 01, 2037 | 2.7808% | $1,000,000,000.00 | 0.2528 | 0.197050193 | $1,385,113.97 |

MTM Calculation (discounted back to spot dates)

| Fixed NPV using 6/13 settle | Fixed NPV using 6/4 settle | MTM, 6/13 relative to 6/12 | Fixed NPV discounted to 6/18 |
|---|---|---|---|
| $801,836,145.96 | $525,784,275.30 | $276,051,870.66 | $526,514,531.23 |

Figure 36

FACTORIZATION OF INTEREST RATE SWAP VARIATION

The present application claims priority to U.S. Provisional Patent Application No. 60/910,568, filed Apr. 6, 2007, the entire disclosure of which is hereby incorporated by reference.

FIELD OF THE INVENTION

The invention relates to trading and clearing of financial instruments. In particular, aspects of the invention relate to processing and clearing interest rate swaps.

BACKGROUND

Over-the-counter (OTC) products include financial instruments that are bought, sold, traded, exchanged, and/or swapped between counterparties. Many OTC derivatives exist to fill a wide range of needs for counterparties, including limiting or mitigating exposure to risks and/or maximizing cash flow. After an exchange of an OTC product, counterparties may expend resources managing the product for the duration of its life. Management may be complicated based on the number of exchanges and/or the specific terms of the contract.

An interest rate swap (IRS) is an example of a type of OTC product where the parties agree to exchange streams of future interest payments based on a specified principal or notional amount. Each stream may be referred to as a leg. Swaps are often used to hedge certain risks, for instance, interest rate risk. They can also be used for speculative purposes.

An example of a swap includes a plain fixed-to-floating, or "vanilla," interest rate swap. The vanilla swap includes an exchange of interest streams where one stream is based on a floating rate and the other interest stream is based on a fixed rate. In a vanilla swap, one party makes periodic interest payments to the other based on a variable interest rate. The variable rate may be linked to a periodically known or agreed upon rate for the term of the swap such as the London Interbank Offered Rate (LIBOR).

In return for the stream of payments based on the variable rate, the other party may receive periodic interest payments based on a fixed rate. The payments are calculated over the notional amount. The first rate is called variable, because it is reset at the beginning of each interest calculation period to the then current reference rate, such as LIBOR published rate. The parties to an IRS swap generally utilize these exchanges to limit, or manage, exposure to fluctuations in interest rates, or to obtain lower interest rates than would otherwise be unobtainable.

Usually, at least one of the legs to a swap has a variable rate. The variable rate may be based on any agreed upon factors such as a reference rate, the total return of a swap, an economic statistic, etc. Other examples of swaps include total return swaps, and Equity Swaps.

A total return swap (also known as total rate of return swap, or TRORS) is a swap where one party receives interest payments based on an underlying asset (plus any capital gains/losses) over the payment period, while the other receives a specified fixed or floating cash flow. The total return is the capital gain or loss, plus any interest or dividend payments. The specified fixed or floating cash flow is typically unrelated to the credit worthiness of the reference asset. The underlying asset may be any asset, index, or basket of assets. The parties gain exposure to the return of the underlying asset, without having to actually hold the asset. That is, one party gains the economic benefit of owning an asset without having the asset on its balance sheet, while the other (which does retain that asset on its balance sheet) has protection against a potential decline in its value. An equity swap is a variation of a total return swap. The underlying asset in an equity swap may be a stock, a basket of stocks, or a stock index.

The expiration or maturity of the future streams of payments may occur well into the future. Each party may have a book of existing and new IRSs having a variety of maturity dates. The parties may expend substantial resources tracking and managing their book of IRSs and other OTC products. In addition, for each IRS, the party maintains an element of risk that one of its counterparties will default on a payment.

Currently, financial institutions such as banks trade interest rate payments and/or IRSs OTC. Steams of future payments must be valued to determine a current market price. The market value of a swap is the sum of the difference between the net present value (NPV) of the future fixed cash flows and the floating rate.

It would be desirable to provide a system and method for managing a centrally cleared international monetary market (IMM) dated swap such that the mark-to-market (MTM) process for the IMM dated swap is simplified while considering the variation amounts inherent in IMM dated swaps.

SUMMARY

Systems and methods are described for more conveniently processing and clearing derivative products such as interest rate swaps (IRSs). The system generally includes clearing a swap having pre-defined parameters. For example, a standard IRS contract may include standard parameters for floating rates, payment calendars, reset frequencies, day-count conventions for fixed and floating rates, etc. Clearing of a swap generally includes having a central clearing party for the swap. The clearing party may act as the counterparty to each participant of an IRS, such that the clearing party compensates each party to the IRS according to, among other things, notional value, net-present value of an IRS, and changes to the interest rate.

In another aspect of the invention, other types of swap products other than interest rate swaps may be used in accordance with various embodiments of the invention.

In another aspect of the invention, a swap value factor (SVF) may be generated to calculate the mark-to-market value of an IRS. The SVF may be a function of interest rates derived from a yield curve.

In yet another aspect of the invention, a computer system configured to process and clear derivative products such as IRSs may receive a performance bond (or margin) deposit from a buyer and seller of the derivative product. Subsequently, both buyer and seller may be required to mark-to-market and pay any losses or collect any profits with respect to the current market price of the derivative on an interval, e.g., daily basis. Cash flow may be generated between the buyer and the seller to reflect the change in the market price of the derivative, i.e., the mark-to-market process. The results of the cleared swap may be used to determine or alter the margin deposit required by the buyer or seller.

The details of these and other embodiments of the present invention are set forth in the accompanying drawings and the description below. Other features and advantages of the invention will be apparent from the description and drawings.

BRIEF DESCRIPTION OF THE DRAWINGS

The present invention may take physical form in certain parts and steps, embodiments of which will be described in detail in the following description and illustrated in the accompanying drawings that form a part hereof, wherein:

FIGS. 3 and 4 illustrate exemplary yield curve information which may be used in accordance with various aspects of the invention.

FIGS. 5-7 illustrate a mark-to-market example for a three year interest rate swap in accordance with aspects of the invention.

FIGS. 8-10 illustrate additional exemplary yield curve information which may be used in accordance with various aspects of the invention.

FIGS. 11-14 illustrate a mark-to-market example for a three month interest rate swap in accordance with aspects of the invention.

FIGS. 15-36 illustrate a mark-to-market example for a thirty year interest rate swap in accordance with aspects of the invention.

DETAILED DESCRIPTION

Figure 1:
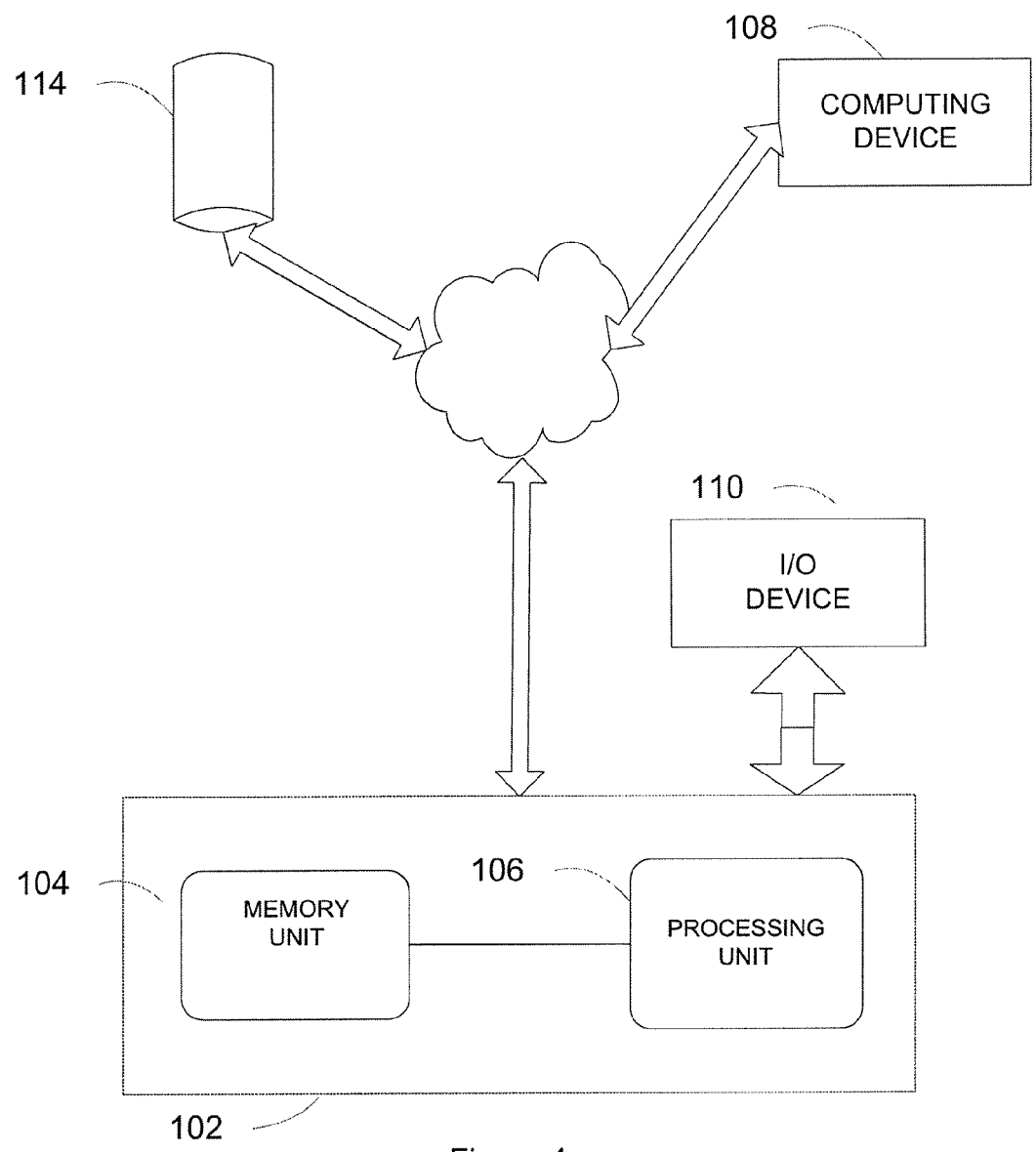
FIG. 1 illustrates a computer network system that may be used to implement aspects of the invention.

An example of a suitable operating environment in which various aspects of the invention may be implemented is shown in FIG. 1. The operating environment is only one example of a suitable operating environment and is not intended to suggest any limitation as to the scope of use or functionality of the invention. The processing unit 106 of computer system 102 executes computer-executable instructions in accordance with aspects of the invention. Memory unit 104 may store computer-executable instructions, which are executed by the computer system 102. The computer-executable instructions may be comprised of modules in accordance with aspects of the invention.

The computer system 102 may have one or more input/output devices 110 (e.g., keyboard, mouse, voice automation, screen, kiosk, handheld computing device display, voice, etc.). Database 114 may be a third-party database containing, for example, information such as the LIBOR rate or other information useful in determining market values of derivative products. The database 114 may be connected through wired or wireless communication networks to the computer system 102. Computing device 108 may be a laptop computer, handheld computing device, or any other mobile computing device. In one embodiment in accordance with the invention, a user of computing device 108 can remotely communicate via the Internet to computer system 102 at a clearinghouse or exchange. The user may remotely enter orders for agreements offered by the exchange and indicate a bank account to pay margin requirements and receive cash flows from swaps.

Of course, numerous additional servers, computers, handheld devices, personal digital assistants, telephones and other devices may also be connected to exchange computer system 102. Moreover, one skilled in the art will appreciate that the topology shown in FIG. 1 is merely an example and that the components shown in FIG. 1 may be connected by numerous alternative topologies.

In accordance with various aspects of the invention, a clearinghouse may act as a guarantor of the agreement for the derivative. At least one benefit of an exchange traded derivative, as opposed to the OTC type, is that the derivative is cleared and guaranteed by the clearinghouse. This may promise more interesting capital efficiencies for institutions that may cross-margin one derivative against another derivative.

In an aspect of the invention, upon execution of an IRS between parties, a clearing process may be initiated to process the cash flows resulting from the transaction. The clearing process may be initiated by, for example, the processing unit 106 of computer system 102. Following the initial cash flow processing, the clearing process maintains the IRS swaps, now-guaranteed by the central clearing party, for its lifespan, e.g., 10 years. As the IRS positions for all parties may be standardized, the floating rate reset and payment processing may be simpler and easier to manage because there is only one floating rate reset and cash flow calendar per currency. The International Swaps and Derivatives Association (ISDA) day-count conventions, affect of holidays and other cash flow and reset related parameters may also be pre-selected.

In another aspect of the invention, an IRS value at a particular date may be calculated to determine the IRS's market value. The IRS value may be determined by, for example, the processing unit 106 of computer system 102. The below illustrative example assumes that swaps are forward starting to the nearest six month IMM date, and that the coupon payment frequency is also six months. Those skilled in the art will realize that this is the convention used for Euro denominated swaps and that USD denominated swaps are forward to the nearest three month IMM date with a three month coupon frequency. Although the below illustrative example may change slightly for USD denominated swaps, the general concepts stated below are also applicable to USD denominated swaps.

Table 1 illustrates an exemplary yield curve. As those skilled in the art will realize, IMM dates are typically Wednesdays but for the below illustrative example Mondays have been utilized. The swap yields in a swap yield curve are the swap rates of market swaps of given tenors. For instance, to value a February 2008 IMM swap—i.e. a swap that terminates on the IMM date in February 2008—as of Feb. 12, 2007 (assumed to be the February 2007 IMM date), the Table 1 yield curve may be utilized. Those skilled in the art will realize that various interest rate curves such as LIBOR swap curves may be used. In addition, other interest rate curves such as curves based on Eurodollars or Treasuries may also be utilized.

TABLE 1

| Dates | Yield Curve | IMM Discount Factor |
|---|---|---|
| Monday, Feb. 12, 2007 | 5.3450% | df0 |
| Monday, Aug. 13, 2007 | 5.4000% | df1 |
| Monday, Feb. 11, 2008 | 5.4150% | df2 |

The rate of 5.4000% on Aug. 13, 2007 (the August 2007 IMM date), may be the fixed swap rate associated with a six month swap which terminates on Aug. 13, 2007. Similarly, the rate of 5.4150% on Feb. 11, 2008 (the February 2008 IMM date), may be the fixed swap rate of a one year swap which terminates on Feb. 11, 2008. The yield curve used to value a one year swap may be built using fixed swap rates for the six month and one year market swaps. Both these swap yields may map to discount factors, which yield the present value, on Feb. 12, 2007, of a $1.00 cash flow occurring on a specific date on the yield curve. The discount factor for Feb. 12, 2007, df0, will be 1, because this is the start date. Once df0 is known, the discount factors for the remaining dates in the curve, df1 and df2, may be obtained.

In another aspect of the invention, swaps cleared through a clearinghouse may use a yield curve that is based off of Swapstream's end of day settlements. In addition, the fixed cash flows associated with a fixed leg of IRS with a notional value of $1.00 may be represented by:

$$C_{fixed} = \sum_{i=1}^{n} [\tau \times (d_i - d_{i-1})_{ACT/360} \times df_i] \qquad \text{EQUATION 1}$$

Wherein the variable definitions may be defined as follows:
τ is the fixed rate on the swap.
"n" is the total number of fixed coupons included in the swap
$d_i$ is the payment date of the $i^{th}$ cash flow
ACT/360 refers to the daycount basis->the number of days between coupon payments, divided by 360.
$df_i$ is the discount factor of the $i^{th}$ cash flow (discounting back to the IMM start date)
The cash flows associated with a floating leg of an IRS may be represented by:

$$C_{float} = \sum_{i=1}^{n} [r_{0.5}^{d_i-1} \times (d_i - d_{i-1})_{ACT/360} \times df_i] \qquad \text{EQUATION 2}$$

Wherein the variable definitions may be defined as follows:
"n" is the total number of floating coupons included in the swap
$d_i$ is the payment date of the $i^{th}$ cash flow
$r_{0.5}^{d_i-1}$ is the six month floating (LIBOR) rate at $d_{i-1}$
ACT/360 refers to the daycount basis
  Actual number of days per month and 360 days per year for all daycount fractions
  Therefore, the number of years in a six month period consisting of 182 days=182/360
$df_i$ is the discount factor of the $i^{th}$ cash flow
Floating cash flow may also be represented as following:

$$C_{float} = \sum_{i=1}^{n} [r_{0.5}^{d_i-1} \times (d_i - d_{i-1})_{ACT/360} \times df_i] = df_0 - df_n \qquad \text{EQUATION 3}$$

Where the variable definitions may be defined as follows:
$C_{float}$ is the discounted sum of floating cash flows
$df_0$ is 1 (present value of $1.00 cash flow occurring on, February $12^{th}$)
$df_n$ is the discount factor associated with the $n^{th}$ cash flow
In another aspect of the invention, an expression for the discount factors may be derived. The discount factors may be derived by, for example, the processing unit 106 of computer system 102. At the time of rate fixing (i.e. at the time of settlement), the NPV of the swap is zero. Therefore, the discounted sum of the fixed cash flows (Equation 1) equals the discounted sum of the floating cash flows (Equation 2):

$$\sum_{i=1}^{n} [\tau \times (d_i - d_{i-1})_{ACT/360} \times df_i] = \qquad \text{EQUATION 4}$$
$$\sum_{i=1}^{n} [r_{0.5}^{d_i-1} \times (d_i - d_{i-1})_{ACT/360} \times df_i]$$

Using Equation 3, the right side of Equation 4 equals $df_0-df_n$. Therefore, Equation 4 becomes:

$$\sum_{i=1}^{n} [\tau \times (d_i - d_{i-1})_{ACT/360} \times df_i] = df_0 - df_n$$

Splitting up the summation on the left side of the equation above yields:

$$\sum_{i=1}^{n} [\tau \times (d_i - d_{i-1})_{ACT/360} \times df_i] + [\tau \times (d_n - d_{n-1})_{ACT/360} \times df_n] = df_0 - df_n$$

Simplifying yields:

$$df_n(1 + \tau \times (d_n - d_{n-1})_{ACT/360}) = df_0 - \sum_{i=1}^{n-1} [\tau \times (d_i - d_{i-1})_{ACT/360} \times df_i]$$

Solving for $df_n$ yields:

$$df_n = \frac{df_0 - \sum_{i=1}^{n-1} [\tau \times (d_i - d_{i-1})_{ACT/360} \times df_i]}{(1 + \tau \times (d_n - d_{n-1})_{ACT/360})} \qquad \text{EQUATION 5}$$

Where the variable definitions may be defined in Equation 5 as follows:
$df_n$ is the $n^{th}$ IMM discount factor in yield curve (to be solved for)
"n" is the number of fixed coupons in the swap's tenor
$df_0$ is equal to 1, as it is the present value of $1.00 today, the IMM valuation date
τ is the fixed rate on the swap
$d_i$ is the payment date of the $i^{th}$ cash flow
  $(d_i-d_{i-1})$ is the number of fractional years between payment dates, on an ACT/360 basis.
$df_i$ is the $i^{th}$ discount factor, discounting back to the IMM start date
In another aspect of the invention, the swap NPV may be calculated by discounting the swap's cash flows back to spot. Each of the IMM discount factors (which represent the present value of a $1.00 coupon cash flow, discounted back to the IMM start date of the swap) may be discounted back to spot. In an embodiment, the spot discount factor of the "$n^{th}$" coupon cash flow may be represented as $sf_n$. The spot discount factor may be calculated as follows:

$$sf_n = \frac{df_n}{(1 + r_{IMM}^{OIS} \times \text{Stub\_days}/360)} \qquad \text{EQUATION 6A}$$

In an alternative embodiment of the discounting methodology, the spot discount factor on the "$n^{th}$" coupon cash flow may be represented as $sf_n$ and calculated as follows:

$$sf_n = \frac{df_n}{\left[1 + r_{IMM}^{OIS} \times (1/360)\right]^{(\text{IMM date-Spot date})_{ACT/360}}} \qquad \text{EQUATION 6B}$$

Those skilled in the art will realize that Equation 6A employs a simple interest based discounting methodology. This is conducive to single cash flow instruments such as OIS swaps (the OIS swap has a single cash flow associated with it that occurs upon maturity of the swap). With reference to the Equation 6A, the fact that the interest rate in the denominator is multiplied by the fractional number of years in the period is indicative of the usage of simple interest based discounting.

Furthermore, as those skilled in the art will realize Equation 6B illustrates an alternative embodiment of the discounting methodology which employs a compound interest based discounting method. This method may be conducive to an instrument that has cash flows that span multiple periods during the life of the instrument. Each cash flow is reinvested upon receipt, thereby creating the effect of earning interest on interest->i.e. compound interest. In Equation 6B, the fact that the (1+r) interest rate term in the denominator is raised to the exponent of the fractional number of years in the period is indicative of compound interest based discounting.

In the following detailed description of the invention, as the OIS instrument in the current implementation of this product has a single cash flow, simple interest based discounting is used. However, as those skilled in the art will realize, one may extend the methodology to employ compound interest based discounting.

In Equations 6A and 6B, the variable definitions may be defined as follows:
- $df_n$ is the IMM discount factor of the $n^{th}$ coupon of the swap. In other words, it is the present value (discounted back to the IMM start date of the swap) occurring on the swap's $n^{th}$ coupon date.
- $r_{IMM}^{OIS}$ is the fixed rate on an overnight indexed swap (OIS), for a given day. OIS swaps will be traded on the Swapstream platform and will mature on the next IMM date. These rates are settled daily—as such, $r_{IMM}^{OIS}$ is the interest rate that prevails between the spot date and the IMM date, which makes it useful for discounting from the IMM date back to spot. Because $r_{IMM}^{OIS}$ as quoted is an annual rate, it is multiplied by 1/360 to yield a daily rate (following the ACT/360 daycount convention). The benefits of using the OIS swap fixed rate for spot discounting may include:
  - The highly liquid nature of OIS swaps make them a viable instrument to obtain spot discount rates from.
  - Providing a standardized discounting method that all interested parties can use to value the swap product.
- Stub_days divided by 360 is the number of fractional years between the spot date and the IMM valuation date. This is the actual number of days in the stub period, and is therefore on an ACT/360 basis. For instance, if there are 3 days between spot and the IMM date, then Stub_days/360=3/360.
- Note that (IMM date–Spot date) in equation 6B and "Stub_days" in equation 6A are used interchangeably.

In an aspect of the invention, a swap value factor (SVF) may be calculated to simplify the mark-to-market (MTM) variation calculation of an interest rate swap. The SVF may include the swap's applicable discount factors and associated daycount fractions into a single factor. The SVF may be a function of interest rates derived from yield curves.

For example, a clearinghouse or other entity may wish to calculate the MTM variation of a six month USD swap (i.e. a swap with two quarterly coupons—swap matures in September 2007) that commences on Mar. 19, 2007 with a notional swap value of $1.00 dollar. For this exemplary scenario, the current date is assumed to be Mar. 16, 2007 with an IMM start date of Mar. 19, 2007. The MTM variation of the swap maturing in September 2007 may be calculated as of the end of the day settlement on Mar. 16, 2007 relative to Mar. 15, 2007, end of day settlement. In this exemplary scenario, the Mar. 15, 2007 settlement rate for the swap maturing in September 2007 is 5.38% and the Mar. 16, 2007 settlement rate is 5.40%. The calculated number of days between the Mar. 19, 2007 (the next IMM date) start date and June 2007 coupon is 91 days. The calculated number of days between the June 2007 coupon and the September 2007 coupon is 92 days. The discount factors used to discount the September 2007 swap's coupon back to March 15 and Mar. 16, 2007 along with the coupon daycounts are illustrated in Table 2.

TABLE 2

| Coupon | Days between coupons | Mar. 16, 2007 Discount Factor |
|---|---|---|
| June 2007 | 91 | 0.9891 |
| September 2007 | 92 | 0.9775 |

Figure 2:
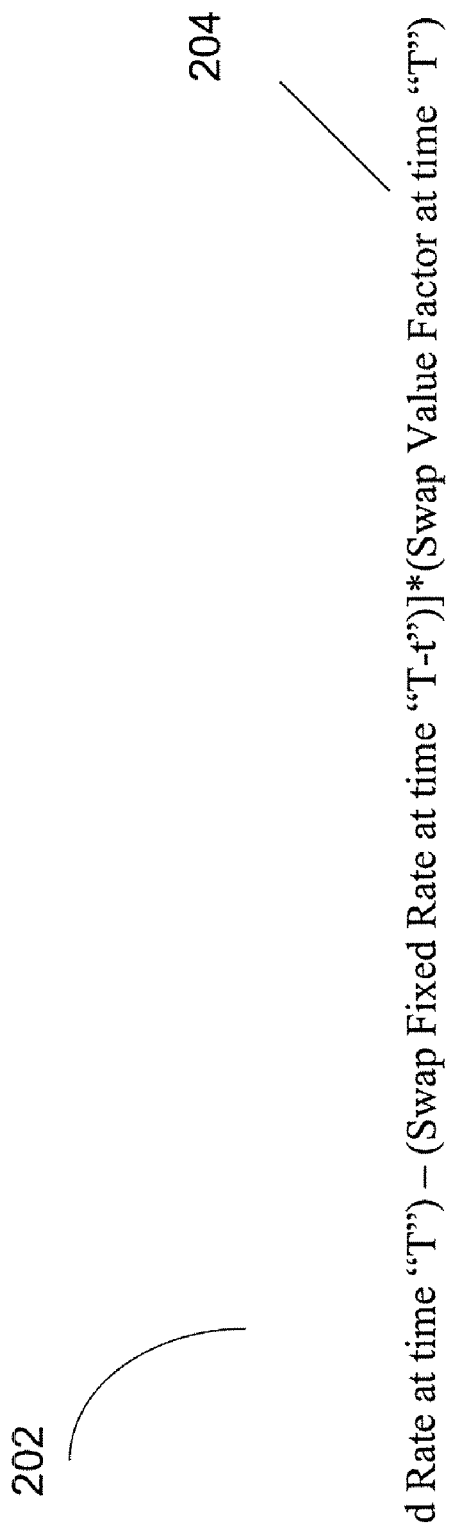
FIG. 2 illustrates a mark-to-market calculation for an interest rate swap using a swap value factor in accordance with an aspect of the invention.

The MTM on Mar. 16, 2007 may be calculated using the equation as illustrated in FIG. 2. As shown in FIG. 2, the MTM 202 of an interest rate swap (per $1 swap notional value, calculated at time "T" relative to time "T-t"), using a SVF at time "T" 204 may be calculated. Applying the equation:

MTM=[(September-07 Settlement Rate on Mar. 16, 2007)–(September-07 Settlement Rate on Mar. 15, 2007)]*(Swap Value Factor on Mar. 16, 2007).

The swap value factors in the above illustrative scenario may be determined by calculating the MTM variation on the September 2007 swap using the following method:

MTM=(Fixed NPV of September-07 using Mar. 16, 2007 settlement)–(Fixed NPV of September-07 using Mar. 15, 2007 settlement)

This relationship holds true since the NPV of the fixed cash flows=the NPV of the floating cash flows at any given settlement. The Fixed NPV of a swap on a given day is the present value of all its coupon cash flows.

Substituting numerical values per the data above:

MTM=(5.40%)*($1.00)*(91/360)*(0.9891)+(5.40%)*
($1.00)*(92/360)*(0.9775)–[(5.38%)*($1.00)*
(91/360)*(0.9891)+(5.38%)*($1.00)*(92/360)*
(0.9775)]

MTM=(5.40%)*[(91/360)*(0.9891)+(92/360)*
(0.9775)]–(5.38%)*[(91/360)*(0.9881)+(92/360)
*(0.9775)]

The daycount fractions (i.e. 91/360 and 92/360) are used above because the fixed settlement rates are annual rates—for a given coupon, they would only apply on a fractional basis as given by the daycount fraction (e.g. 91/360 for the June 2007 coupon in this example->the denominator is 360 since the daycount convention being followed is ACT/360).

The discount factors listed above discount the cash flows back to the dates March 15th and March 16th. The discount factors derived from the swap curve would only discount back to the IMM date of March 19th. In order to discount back from March 19th to each of March 15th and March 16th, stub discount rates are required. It is assumed that all necessary stub discounting has been done in arriving at the discount factors given above.

Based on the above, the Swap Value Factor may be expressed as

[(91/360)*(0.9891)+(92/360)*(0.9775)]

In accordance with an aspect of the invention, the swap value factor for a given day may be calculated as the (daycount fraction*discount factor) product summed over the swap's coupons.

FIGS. 3 and 4 illustrate exemplary yield curve information which may be used in accordance with various aspects of the invention. For example, the exemplary yield curves shown in FIGS. 3 and 4 may be used in the calculation of a three year interest rate swap as illustrated in FIGS. 5-7 in accordance with aspects of the invention.

Additionally, FIGS. 5-7 illustrate that the mark-to-market calculation using the SVFs are equivalent to the mark-to-market calculation using the traditional valuation methodology.

In FIG. 3, an exemplary yield curve 302 shown in table format is illustrated for May 30, 2007. Similarly, FIG. 4 illustrates an exemplary yield curve 402 in table format for May 31, 2007.

Table 3 illustrated below details inputs for use in an exemplary calculation of a mark-to-market value using SVFs for a three year swap. In Table 3, the last market date is shown to be Wednesday, May 30, 2007, the current date is shown as Thursday, May 31, 2007, and the forward IMM start date of the swap is Monday, Jun. 18, 2007.

TABLE 3

| Input | Value |
|---|---|
| Last Mark Date | Wednesday, May 30, 2007 |
| Today | Thursday, May 31, 2007 |
| Forward IMM Start Date | Monday, Jun. 18, 2007 |
| Notional Amount of Swap | $1,000,000,000.00 |
| OIS Swap Rate on May 30, 2007 | 8.6532% |
| Days between May 30, 2007 and Jun. 18, 2007 | 19.0000 |
| OIS Swap Rate on May 31, 2007 | 8.6531% |
| Days between May 31, 2007 and Jun. 18, 2007 | 18.0000 |
| Jun-10 CME Swap Settlement Rate on May 31, 2007 | 6.7530% |
| Jun-10 CME Swap Settlement Rate on May 30, 2007 | 6.7530% |

FIG. 5 illustrates the calculation of a fixed NPV on May 30, 2007 for a three year interest rate swap using a swap value factor in accordance with an aspect of the invention. As shown in FIG. 5, a fixed NPV 501 of $185,549,800.56 may be calculated as of May 30, 2007 for a swap with a notional value 503 of $1,000,000,000. A SVF 502 may be calculated having a numerical value of 2.7476647499 which is the sum of the coupon value factors 504. Each of the coupon value factors which may be calculated on the coupon expiration dates may be calculated as the product of the Daycount Fraction 506 and the Spot Discount Factor 508.

FIG. 6 illustrates the calculation of a fixed NPV on May 31, 2007 for a three year interest rate swap using a swap value factor in accordance with an aspect of the invention. As shown in FIG. 6, a fixed NPV 601 of $185,549,800.56 may be calculated as of May 31, 2007 for a swap with a notional value 603 of $1,000,000,000. A SVF 602 may be calculated having a numerical value of 2.7476647499 which is the sum of the coupon value factors 604. Each of the coupon value factors which may be calculated on the coupon expiration dates may be calculated as the product of the Daycount Fraction 606 and the Spot Discount Factor 608. As shown in FIG. 6, the mark-to-market value on May 31, 2007 relative to May 30, 2007 of $0.00 "612" may be calculated by subtracting the calculated swap NPVs arrived at by using the May 31$^{st}$ and May 30$^{th}$ settlement prices.

FIG. 7 verifies the accuracy of the mark-to-market valuation (calculated using the swap value factors) for a three year swap on May 31, 2007 relative to May 28, 2007 in accordance with an aspect of the invention. In FIG. 7, the coupons are discounted back to an IMM date using IMM discount factors 702. Using the IMM discount factors 702, present values of the coupons 704 may be determined. Net present values discounted back to June 18$^{th}$ (forward IMM date) of $186,352,591.05 "706" and $186,352,591.05 "708" may be calculated. The net present value calculations "706" and "708" may be discounted from the June 18$^{th}$ forward IMM date to the spot date of May 31$^{st}$. A mark-to-market value on May 31, 2007 relative to May 30, 2007 of $0.00 "710" may be calculated by subtracting the calculated swap NPVs arrived at by using May 31$^{st}$ and May 30$^{th}$ settlement prices.

FIGS. 8-10 illustrate exemplary yield curve information which may be used in accordance with various aspects of the invention. FIGS. 11-36 illustrate additional exemplary mark-to-market values for different interest rate swaps of varying durations in accordance with various aspects of the invention.

In particular, FIGS. 11-14 illustrate exemplary MTM calculations using swap value factors for a three month swap on Mar. 14, 2007 relative to Mar. 13, 2007 in accordance with an aspect of the invention.

FIGS. 15-36 illustrate exemplary MTM calculations using swap value factors for a thirty year swap in accordance with an aspect of the invention. Those skilled in the art will realize that any swap duration may be utilized and will fall within the methodology of the described aspects of the invention.

Figure 37:
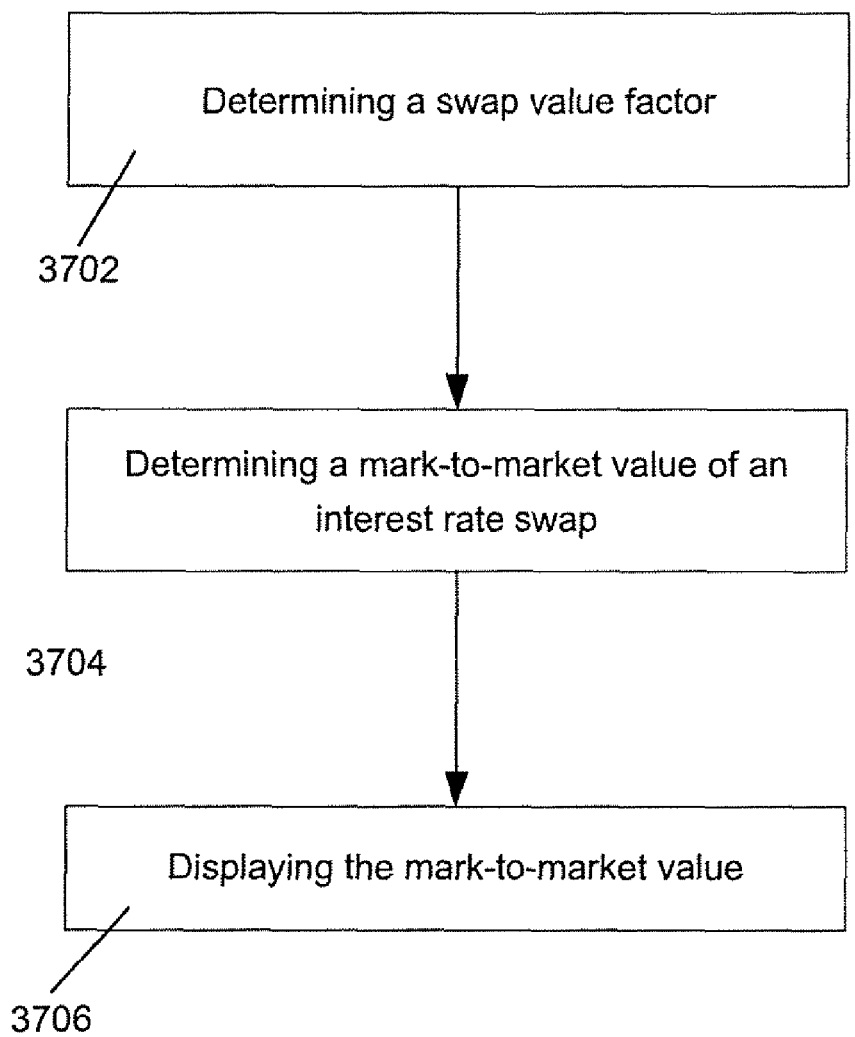
FIG. 37 illustrates a flow diagram to determine the mark-to-market value of an interest rate swap product in accordance with an aspect the invention.

FIG. 37 illustrates a flow diagram to determine the mark-to-market value of an interest rate swap product at a time $T_2$ relative to an earlier time $T_1$ in accordance with an aspect the invention. In a first step 3702, a swap value factor may be determined by a central clearing party. In an embodiment, the central clearing party may be a clearing house. The swap value factor may encapsulate at least one discounting factor associated with the interest rate swap into a single swap value factor. The swap value factor may be a sum of coupon value factors.

In an aspect of the invention, each coupon value factor may be calculated for a coupon expiration date as a product of a daycount fraction and spot discount factor. The daycount fraction may be the number of days from the IMM start date of the swap until first coupon date divided by 360.

In another aspect of the invention, the spot discount factor may be calculated using the equation (equation 6A above):

$$sf_n = \frac{df_n}{(1 + r_{IMM}^{OIS} \times \text{Stub\_days}/360)}$$

As those skilled in the art will realize, this equation uses a simple interest based discounting methodology. Such a simple interest discounting method may be conducive to single cash flow instruments such as OIS swaps (the OIS swap has a single cash flow associated with it that occurs upon maturity of the swap).

In an alternative embodiment, the spot discount factor may also be calculated by using the equation, (as discussed above equation 6B):

$$sf_n = \frac{df_n}{[1 + r_{IMM}^{OIS} \times (1/360)]^{(IMM\ date-Spot\ date)_{ACT/360}}}$$

Those skilled in the art will realize Equation 6B illustrates an alternative embodiment of the discounting methodology which employs a compound interest based discounting method. This method may be conducive to an instrument that has cash flows that span multiple periods during the life of the instrument.

In step 3704, the mark-to-market value of the interest rate swap product at time $T_2$ relative to time $T_1$ may be calculated by subtracting a settlement price at $T_1$ from a settlement price at $T_2$ and multiplying the difference by the swap value factor. Finally in step 3706, the mark-to-market values may be displayed.

The present invention has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended claims.

We claim:

1. A method of determining a mark-to-market value of an interest rate swap product at time $T_2$ relative to an earlier time $T_1$, the method comprising:
    (a) determining, by a processor, a swap value factor for discounting back to time $T_2$;
    (b) determining the mark-to-market value of the interest rate swap product at time $T_2$ relative to time $T_1$ by subtracting a settlement price at $T_1$ from a settlement price at $T_2$ and multiplying this difference by the swap value factor determined in (a); and
    (c) outputting the mark-to-market value.

2. The method of claim 1, wherein the swap value factor encapsulates at least one discounting factor associated with the interest rate swap into a single swap value factor.

3. The method of claim 1, wherein the swap value factor is a sum of coupon value factors.

4. The method of claim 3, wherein each coupon value factor is calculated for a coupon expiration date as a product of a daycount fraction and spot discount factor.

5. The method of claim 4, wherein the daycount fraction is number of days from an international monetary market (IMM) start date of the swap until a first coupon date divided by 360 for the first coupon.

6. The method of claim 4, wherein the spot discount factor comprises:

$$sf_n = \frac{df_n}{(1 + r_{IMM}^{OIS} \times \text{Stub\_days}/360)}.$$

7. The method of claim 4, wherein the spot discount factor comprises:

$$sf_n = \frac{df_n}{[1 + r_{IMM}^{OIS} \times (1/360)]^{(IMM\ date-Spot\ date)_{ACT/360}}}.$$

8. The method of claim 1, wherein the net present value at time $T_1$ is a function of an estimated yield curve.

9. An apparatus configured to determine a mark-to-market value of an interest rate swap product at a time $T_2$ relative to an earlier time $T_1$, the apparatus comprising:
    a memory unit; and
    a processing unit coupled to the memory unit and configured to cause the apparatus at least to perform:
    (a) determining a swap value factor;
    (b) determining the mark-to-market value of the interest rate swap product at time $T_2$ relative to time $T_1$ by subtracting the settlement price at $T_1$ from the settlement price at $T_2$ and multiplying this difference by the swap value factor determined in (a); and
    (c) causing display of the mark-to-market value.

10. The apparatus of claim 9 wherein the swap value factor is a sum of coupon value factors.

11. The apparatus of claim 10, wherein each coupon value factor is calculated for a coupon expiration date as a product of a daycount fraction and spot discount factor.

12. The apparatus of claim 11, wherein the daycount fraction is the number of days from an international monetary market (IMM) start date of the swap until the first coupon date divided by 360.

13. The apparatus of claim 12, wherein a next coupon date is the international monetary market (IMM) date.

14. A memory containing computer-executable instructions for causing a computer device to determine a mark-to-market value of an interest rate swap product at a time $T_2$ relative to an earlier time $T_1$ by performing the steps comprising:
    (a) determining a swap value factor at time $T_2$;
    (b) determining the mark-to-market value of the interest rate swap product at time $T_2$ relative to time $T_1$ by subtracting the settlement price at $T_1$ from the settlement price at $T_2$ and multiplying this difference by the swap value factor determined in (a); and
    (c) outputting the mark-to-market value.

15. The memory of claim 14, wherein the swap value factor comprises a sum of coupon value factors.

16. The memory of claim 15, wherein each coupon value factor is calculated for a coupon expiration date as a product of a daycount fraction and spot discount factor.

17. The memory of claim 16, wherein the daycount fraction is a number of days until a next coupon date divided by 360.

18. The memory of claim 17, wherein the next coupon date is an international monetary market (IMM) date.

19. A method of settling an interest rate swap through a central clearing party computer, the method comprising
    (a) determining at the central clearing party computer a swap value factor relative to a later mark time $T_2$;
    (b) determining at the central clearing party computer a mark-to-market value of the interest rate swap product at time $T_2$ relative to time $T_1$, wherein determining in step (b) comprises:
        (1) subtracting a settlement price at $T_1$ from a settlement price at $T_2$; and
        (2) multiplying the difference by the swap value factor determined in (a); and
    (c) outputting the mark-to-market value.

20. The method of claim 19, wherein the central clearing party computer comprises a clearinghouse.

21. The method of claim 20, wherein the clearinghouse comprises an exchange.

* * * * *